US012432338B1

(12) United States Patent
Lu et al.

(10) Patent No.: US 12,432,338 B1
(45) Date of Patent: Sep. 30, 2025

(54) IMAGE SENSORS WITH DYNAMIC PIXEL DEFECT DETECTION AND CORRECTION

(71) Applicant: Fairchild Imaging, Inc., San Jose, CA (US)

(72) Inventors: Alexander Lu, San Jose, CA (US); William G. Tian, Campbell, CA (US); Angel Lopez, Newark, CA (US); Mark Hess, San Francisco, CA (US)

(73) Assignee: FAIRCHILD IMAGING, INC., San Jose, CA (US)

( * ) Notice: Subject to any disclaimer, the term of this patent is extended or adjusted under 35 U.S.C. 154(b) by 0 days.

(21) Appl. No.: 18/669,045

(22) Filed: May 20, 2024

(51) Int. Cl.
H04N 17/00 (2006.01)
H04N 25/445 (2023.01)

(52) U.S. Cl.
CPC ......... H04N 17/002 (2013.01); H04N 25/445 (2023.01)

(58) Field of Classification Search
CPC .......................... H04N 17/002; H04N 25/445
See application file for complete search history.

(56) References Cited

U.S. PATENT DOCUMENTS

| | | | |
|---|---|---|---|
| 7,408,578 B2 | 8/2008 | Chapman et al. |
| 7,508,975 B2 | 3/2009 | Izumi et al. |
| 7,800,662 B2 | 9/2010 | Sumiya |
| 7,876,369 B2 | 1/2011 | Aoki |
| 7,929,030 B2 | 4/2011 | Sugizaki |
| 8,325,253 B2 | 12/2012 | Sumiya |
| 8,537,253 B2 | 9/2013 | Ichikawa |
| 8,754,964 B2 | 6/2014 | Yamaguchi |
| 8,836,826 B2 | 9/2014 | Ohbuchi et al. |
| 8,885,077 B2 | 11/2014 | Kolli |
| 8,902,336 B2 | 12/2014 | Kolli |

(Continued)

FOREIGN PATENT DOCUMENTS

| | | |
|---|---|---|
| WO | 2008/027475 A2 | 3/2008 |
| WO | 2011049777 A1 | 4/2011 |

OTHER PUBLICATIONS

Liu Yongji, A Design of Dynamic Defective Pixel Correction for Image Sensor, IEEE International Conference on Artificial Intelligence and Information Systems Mar. 20-22, 2020, pp. 713-716.

Primary Examiner — James M Pontius
(74) Attorney, Agent, or Firm — Panitch Schwarze Belisario & Nadel LLP

(57) ABSTRACT

Defect detection and correction circuitry for image sensors. Example circuitry includes dynamic defect detection circuitry configured to determine an average of a subset of a plurality of pixel output values, the subset excluding maximum and minimum values from among the plurality of pixel output values, determine one or more thresholds based on the average and a difference between a second highest pixel output value and a second lowest pixel output value from among the plurality of pixel output values, and based on an original output value of a pixel-under-correction (PUC) transgressing one of the thresholds, indicate that the PUC has a dynamic defect. The circuitry further includes defect correction circuitry configured to apply a defect correction process based the PUC having either a dynamic defect or a mapped defect, and to produce a corrected output value for the PUC based on the defect correction process.

20 Claims, 13 Drawing Sheets

(56) References Cited

U.S. PATENT DOCUMENTS

| | | |
|---|---|---|
| 9,066,033 B2 | 6/2015 | Yamaguchi |
| 9,124,832 B2 | 9/2015 | Kolli |
| 9,197,871 B2 | 11/2015 | Shoyama |
| 9,549,157 B2 * | 1/2017 | Shinozaki ............. H04N 25/44 |
| 9,578,320 B1 * | 2/2017 | Li .................. H04N 17/002 |
| 9,710,911 B2 * | 7/2017 | Marvin .................. G06T 7/246 |
| 9,781,365 B2 | 10/2017 | Subbotin |
| 9,787,922 B2 | 10/2017 | Lin et al. |
| 9,832,402 B2 | 11/2017 | Elikhis et al. |
| 9,894,302 B2 | 2/2018 | Shinozaki |
| 10,348,989 B2 | 7/2019 | Fujita |
| 10,404,931 B2 | 9/2019 | Maltese et al. |
| 10,440,299 B2 * | 10/2019 | Lin ..................... H04N 25/67 |
| 10,554,914 B1 * | 2/2020 | Lin ..................... H04N 25/68 |
| 10,868,985 B2 * | 12/2020 | Lin ..................... H04N 25/67 |
| 10,951,843 B2 | 3/2021 | Lin et al. |
| 2009/0110324 A1 | 4/2009 | Li et al. |
| 2010/0182660 A1 * | 7/2010 | Mimoune ............. H04N 23/88 358/518 |
| 2013/0100320 A1 | 4/2013 | Yamada et al. |
| 2013/0161595 A1 * | 6/2013 | Kim ..................... H10K 50/80 257/89 |
| 2013/0321673 A1 * | 12/2013 | Lim ..................... H04N 17/002 348/241 |
| 2013/0329237 A1 * | 12/2013 | Li ............................ H04N 1/64 358/1.9 |
| 2017/0070692 A1 * | 3/2017 | Lin ........................ H04N 25/67 |
| 2017/0154427 A1 * | 6/2017 | Marvin .................. G06T 7/246 |
| 2020/0084401 A1 * | 3/2020 | Lin ........................ H04N 25/67 |
| 2023/0099029 A1 * | 3/2023 | Hsu ........................ F21S 41/13 362/466 |
| 2023/0102095 A1 * | 3/2023 | Hsu .................. B60W 60/0015 701/23 |
| 2023/0102898 A1 * | 3/2023 | Hsu .................. B60W 60/0015 340/5.61 |

* cited by examiner

| | | | | | | | |
|---|---|---|---|---|---|---|---|
| B | LG P1 | B | LG P2 | B | LG P3 | B | LG |
| DG | R | DG | R | DG | R | DG | R |
| B | LG P4 | B | LG PUC | B | LG P5 | B | LG |
| DG | R | DG | R | DG | R | DG | R |
| B | LG P6 | B | LG P7 | B | LG P8 | B | LG |
| DG | R | DG | R P1″ | DG | R P2″ | DG | R P3″ |
| B | LG | B | LG | B | LG | B | LG |
| DG | R | DG | R P4″ | DG | R | DG | R P5″ |

FIG. 4B

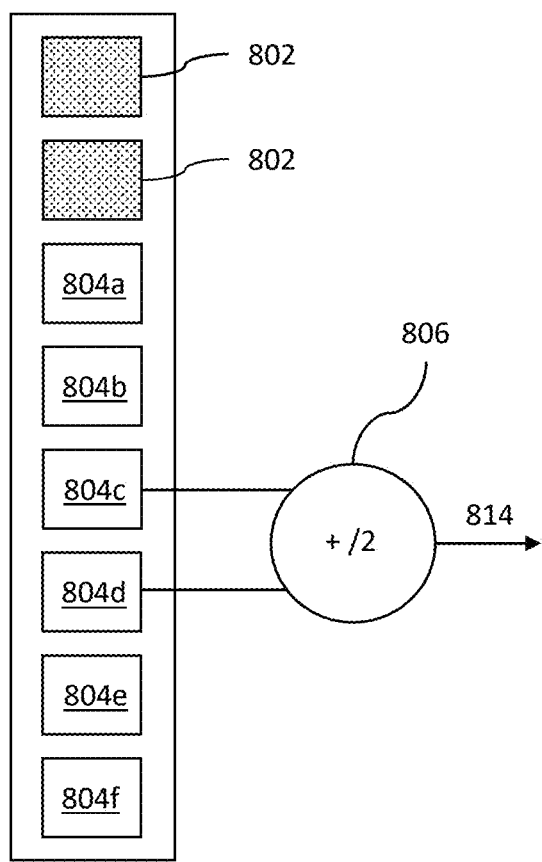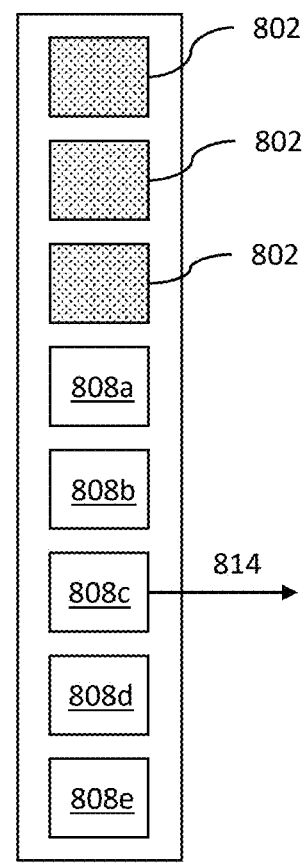
FIG. 8A
FIG. 8B

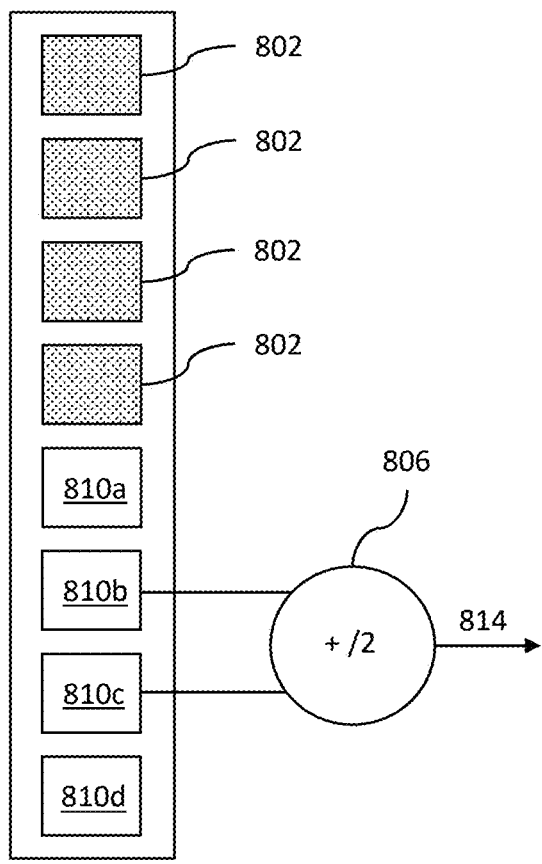 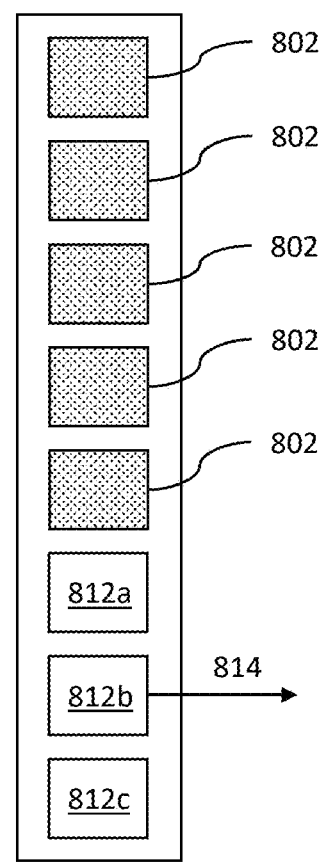
FIG. 8C
FIG. 8D

IMAGE SENSORS WITH DYNAMIC PIXEL DEFECT DETECTION AND CORRECTION

BACKGROUND

Image sensors, such as CMOS image sensors, are widely used for a number of different applications across a large portion of the electromagnetic spectrum. Many image sensor designs use a two-dimensional array of sensors to capture impinging light across a given area. Each sensor may be considered a single pixel of the sensor array, with the pixels arranged in any number of rows and columns. Each pixel sensor includes some form of photodetector as well as a read-out circuit that converts the charge accumulated by the photodetector ("photocharge") during the image exposure to a voltage that is read out by a read-out amplifier. In some examples, two or more pixel sensors in the same row or column share a common read-out amplifier.

In some instances, one or more pixels in a sensor array may be defective. Defective pixels may provide no output or an output that does not accurately represent the light incident on that pixels relative to the light incident on other pixels in the sensor array. Defective pixels can cause errors or missing information in the images produced from the sensor array. Accordingly, detecting defective pixels and performing corrections to account for the defect(s) may be desirable. However, existing techniques for defect correction in some image sensors are limited to one dimensional (horizontal) correction for monochromatic color filter array (CFA) sensors. Accordingly, defect detection and correction remains a challenge in image sensors.

SUMMARY

Aspects and embodiments are directed to techniques for adaptive pixel defect corrections based on detection of static (also referred to as "mapped") and/or dynamic pixel defects.

According to one embodiment, defect detection and correction circuitry comprises dynamic defect detection circuitry configured to receive an input signal specifying a plurality of pixel output values and an original output value of a pixel under correction (PUC), determine an average value based on a subset of the plurality of pixel output values, wherein the subset excludes a maximum pixel output value from among the plurality of pixel output values and a minimum pixel output value from among the plurality of pixel output values, determine one or more thresholds based on the average value and a difference between a second highest pixel output value from the plurality of pixel output values and a second lowest pixel output value from the plurality of pixel output values, and based on the original output value of the PUC transgressing a threshold of the one or more thresholds, to provide a first output signal indicating that the PUC has a dynamic defect. The defect detection and correction circuitry further comprises defect correction circuitry coupled to the dynamic defect detection circuitry and configured to apply a defect correction process based on one of the first output signal or a defect signal indicating that the PUC has a mapped defect, and to produce, based on the defect correction process, a second output signal indicating a corrected output value for the PUC.

According to another embodiment, an image sensor comprises a pixel array including a plurality of pixels arranged in rows and columns, the plurality of pixels including a pixel under correction (PUC) and a plurality of surrounding pixels physically positioned around the PUC in the pixel array, the PUC configured to produce a PUC output signal having an original PUC value, and the plurality of surrounding pixels configured to produce a corresponding plurality of pixel output signals having respective pixel output values, and dynamic defect detection circuitry coupled to the pixel array. The dynamic defect detection circuitry is configured to determine an average value based on a subset of the respective pixel output values, wherein the subset excludes a maximum pixel output value and a minimum pixel output value from among the pixel output values, determine one or more thresholds based on the average value and a difference between a second highest pixel output value of pixel output values and a second lowest pixel output value of the pixel output values, and determine, based on the original PUC value and the one or more thresholds, whether the PUC has a dynamic defect. The image sensor further comprises defect correction circuitry coupled to the dynamic defect detection circuitry and configured to apply, based on one of an output signal from the dynamic defect detection circuitry indicating that the PUC has a dynamic defect or a defect signal indicating that the PUC has a mapped defect, a defect correction process to produce a corrected output value for the PUC.

Another embodiment is directed to a computer program product comprising one or more non-transitory computer readable media storing instructions that, when executed by at least one processor, cause a process for defect detection and correction in an image sensor to be carried out, the image sensor including a pixel array. In one embodiment, the process comprises receiving a signal specifying a plurality of pixel output values and an original output value of a pixel under correction (PUC), determining an average value based on a subset of the plurality of pixel output values, wherein the subset excludes a maximum pixel output value from among the plurality of pixel values and a minimum pixel output value from among the plurality of pixel output values, determining one or more thresholds based on the average value and a difference between a second highest pixel output value from the plurality of pixel output values and a second lowest pixel output value from the plurality of pixel output values, determining, based on the original output value of the PUC and the one or more thresholds, whether the PUC has a dynamic defect, and based on the PUC having the dynamic defect or a mapped defect, applying a defect correction process to produce a corrected output value for the PUC.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

In the figures:

FIG. 4B is a diagram illustrating another example of a pixel array, in accordance with aspects of the present disclosure;

FIGS. 8A-H are diagrams illustrating examples of selecting pixel output values to apply defect correction, in accordance with aspects of the present disclosure.

DETAILED DESCRIPTION

Figure 1:
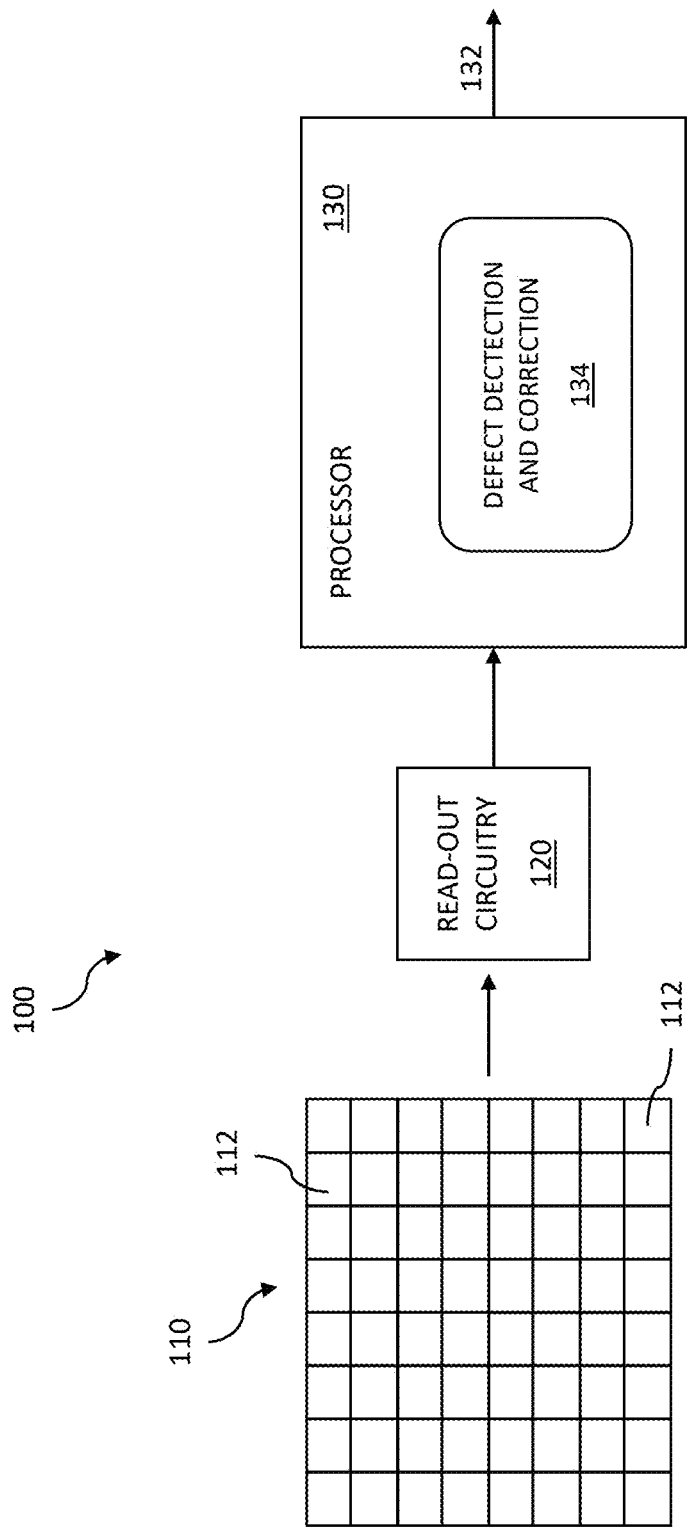
FIG. 1 is a block diagram of an example of an image sensor, in accordance with aspects of the present disclosure.

Techniques are disclosed for detecting defective pixel sensors in an image sensor and for applying corrections to compensate for the defective pixels and improve output image quality.

Certain embodiments are directed to defect detection and correction circuitry comprising dynamic defect detection circuitry and defect correction circuitry coupled to the dynamic defect detection circuitry. The dynamic defect detection circuitry may be configured to receive an input signal specifying a plurality of pixel output values and an original output value of a pixel under correction (PUC), and to determine an average value based on a subset of the plurality of pixel output values. In some examples, the subset excludes a maximum pixel output value from among the plurality of pixel output values and a minimum pixel output value from among the plurality of pixel output values. The subset may further exclude a second highest pixel output value from the plurality of pixel output values and a second lowest pixel output value from the plurality of pixel output values. The dynamic defect detection circuitry may be further configured to determine one or more thresholds based on the average value and a difference between the second highest pixel output value and the second lowest pixel output value, and based on the original output value of the PUC transgressing a threshold of the one or more thresholds, to provide a first output signal indicating that the PUC has a dynamic defect. In some examples, the defect correction circuitry is configured to apply a defect correction process based on one of the first output signal or a defect signal indicating that the PUC has a mapped defect, and to produce, based on the defect correction process, a second output signal indicating a corrected output value for the PUC.

General Overview

As described above, in an image sensor, one or more pixels of a pixel array may be defective. In some instances, a defective pixel does not respond to incident light and provides either no output or a minimal output based on the incident light. In other instances, a defective pixel may respond to incident light, but provide an inaccurate output value, such that the pixel is lighter or darker than it should be. The types of defects are generally divided into two categories, namely static defects (also referred to as mapped defects) and dynamic defects. Some pixels may be defective because of defects in the technology of the sensor array itself. Such defective pixels can be identified during a test or calibration procedure and their location(s) in the pixel array recorded. Defects of this nature are referred to as static defects, or mapped defects, since, for a given pixel array, the defect(s) are associated with one or more particular individual pixels in the array and the location of defect(s) in the array does not change. Accordingly, upon discovery of the defective pixel(s) (e.g., during testing or calibration), the location(s) of the defective pixel(s) can be mapped (e.g., identified by row and column number in the array) and stored. Image processing techniques can be applied to compensate for the mapped defects when the output image is produced, as described further below.

Dynamic defects can be caused by defects in the technology of the sensor array itself (similar to static defects), or by errors in the conversion process of the optical signal. In the case of a dynamic defect, a pixel may respond correctly to incident light in some circumstances, but not in others. In some examples, different conditions (e.g., different intensity and/or wavelength of the incident light, or a different integration/exposure time for the pixel array) can cause different pixels to exhibit defective behavior. For example, under one set of conditions, a first pixel in the pixel array may respond "normally" (e.g., provide an output value that is consistent with the output values from other pixels in the array), whereas a second pixel does not (e.g., provides no output, or provides an output value that is significantly different from the outputs of other pixels exposed to the same incident light under the same conditions), while under a second set of conditions, the second pixel may respond normally whereas the first pixel (or some other pixel in the array) does not. Such defects are referred to as "dynamic" defects since the defect is not present under all conditions and/or may change position(s) in the array (e.g., which pixel(s) are responsible for the defect can change) depending on the conditions. Thus, unlike mapped defects, which can be located once and remain the same for multiple exposures of the array, dynamic defects can vary from exposure to exposure.

Accordingly, techniques are disclosed herein for detecting dynamic defects. As described in more detail below, in some examples, a dynamic defect detection process includes analyzing the pixels surrounding a current pixel-under-test in the array to determine an average output value to which the output from the current pixel-under-test can be compared. A defect may be determined if a difference between the output from the pixel-under-test and the average transgresses a certain threshold or falls within a certain range. In some examples, maximum and minimum output values from the surrounding pixels are ignored/discarded to eliminate outliers. Dynamic defects may be dependent on the temperature of the image sensor and/or the sensor gain. In some instances, a dynamic defect may be more significant or more noticeable at higher gain values or higher temperature. Similarly, dynamic defects may be dependent on the integration time for image collection. Accordingly, examples of the dynamic defect detection processes disclosed herein can be include techniques to account for the effects of varying integration time, analog gain, digital gain, and/or temperature, as described further below.

In addition, techniques are disclosed herein for correcting or compensating for mapped and/or dynamic defects in a sensor array. According to certain examples, techniques provide two-dimensional (e.g., horizontal, vertical, and/or diagonal) defect correction for both monochromatic and color filter array sensor (e.g., RGB, such as Bayer or another red, green, and blue arrangement, or other types of color patterns). As described in more detail below, in some examples, a correction process applies comparison among directional sums of absolute distance (SADs) and applies a mean value for correction if no deterministic direction is reached. The correction process may be adjustable to maximize sensor image quality. Defect detection and/or correction process according to various examples may be implemented using one or more processors and/or logic circuitry that may be integrated with an image sensor, or as a field programmable gate array (FPGA) or other computing platform that may be coupled to the image sensor.

According to some embodiments, defect detection and correction circuitry comprises dynamic defect detection circuitry and defect correction circuitry coupled to the dynamic defect detection circuitry. The dynamic defect detection circuitry may be configured to receive an input signal specifying a plurality of pixel output values and an original output value of a pixel under correction (PUC), and to determine an average value based on a subset of the plurality of pixel output values. In some examples, the defect detection and correction circuitry is part of an image sensor and is coupled to a pixel array of the image sensor. Individual pixels of the pixel array may be configured to produce respective output signals having the plurality of pixel output values. In some examples, the subset excludes a maximum pixel output value from among the plurality of pixel values and a minimum pixel output value from among the plurality of pixel output values. This may advantageously exclude potential outliers that could negatively impact correction performance of the defect detection and correction circuitry, as described further below. The subset may further exclude a second highest pixel output value from the plurality of pixel output values and a second lowest pixel output value from the plurality of pixel output values, as these values may be used elsewhere. For example, the dynamic defect detection circuitry may be further configured to determine one or more thresholds based on the average value and a difference between the second highest pixel output value and the second lowest pixel output value. Based on the original output value of the PUC transgressing one of the one or more thresholds, the dynamic defect detection circuitry may provide a first output signal indicating that the PUC has a dynamic defect. In some examples, the defect correction circuitry is configured to apply a defect correction process based on one of the first output signal or a defect signal indicating that the PUC has a mapped defect, and to produce, based on the defect correction process, a second output signal indicating a corrected output value for the PUC.

Example System Architecture

FIG. 1 is a block diagram of an example of an image sensor 100, according to some embodiments. The image sensor 100 may represent or be an integral part of a charge coupled device (CCD) camera or other type of imaging device. In some embodiments, the image sensor 100 may be configured for capturing different portions of the electromagnetic spectrum, such as visible light, ultraviolet radiation, infrared radiation, or x-rays, to name a few examples. The image sensor 100 may include a pixel array 110, array read-out circuitry 120, and a processor 130. Each of the illustrated components may be included together on same printed circuit board (PCB) or together in a single chip package (e.g., a system-in-package or system-on-chip). In some other embodiments, any one or more of the elements may be provided in a separate chip package and/or on separate PCBs.

According to some embodiments, the pixel array 110 includes a plurality of pixels 112 arranged in a row-column format. Each pixel 112 of the pixel array 110 may have a similar architecture that includes a photodetector and a read-out circuit. In some examples, the read-out converts the charge accumulated by the photodetector during the image exposure to a voltage that is output by the pixel. The photo detection area of each pixel 112 on which incident radiation may impinge may vary from one embodiment to the next, but in some example cases has a physical size of around 1 µm×1 µm up to around 5 µm×5 µm. Likewise, the shape and lensing (if present) of the photo detection area (e.g., photo diode) can also vary from one example to the next, depending on factors such as desired fill factor of the array. In some examples, the pixel array 112 is a color filter array (CFA), with individual pixels 112 having a particular filter that filters the incident light by wavelength range. For example, the pixel array 112 may implement a Bayer filter to provide information about the intensity of light in red, green, and blue (RGB) wavelength regions. The raw image data captured by the CFA can be converted to a full-color image (with intensities of all three RGB colors represented at each pixel) by the processor 130 using a demosaicing process tailored for the particular type of color filter.

The array read-out circuitry 120 may include various components configured to transform the voltages output by the pixels 112 of the pixel array 110 to one or more digital signals that can be processed by the processor 130. In some examples, the array read-out circuitry may include one or more amplifiers, such as row and/or column amplifiers, for example. The array read-out circuitry 120 may further include one or more analog-to-digital converters.

The processor 130 may be configured to receive a digitized signal from the array read-out circuitry 120 and perform any number of operations with the signal(s). For example, the processor 130 may receive signal data from the pixel array 110 (via the array read-out circuitry 120) and use the signal data to create an output signal 132 that may include an image or a portion of an image captured via the pixel array 110. According to some embodiments, the processor 130 includes circuitry and/or is configured to apply defect detection and correction processes according to examples described herein. Thus, the processor 130 may include (or in some instances, may be coupled to) defect detection and correction circuitry 134, which may be implemented in hardware, software, firmware, or any combination thereof. As used herein, the term "processor" may refer to any device or portion of a device that processes electronic data from registers and/or memory to transform that electronic data into other electronic data that may be stored in registers and/or memory. The processor 130 may include one or more digital signal processors (DSPs), application-specific integrated circuits (ASICs), central processing units (CPUs), graphics processing units (GPUs), server processors, custom-built semiconductor device(s), or any other suitable processing devices.

Figure 2:
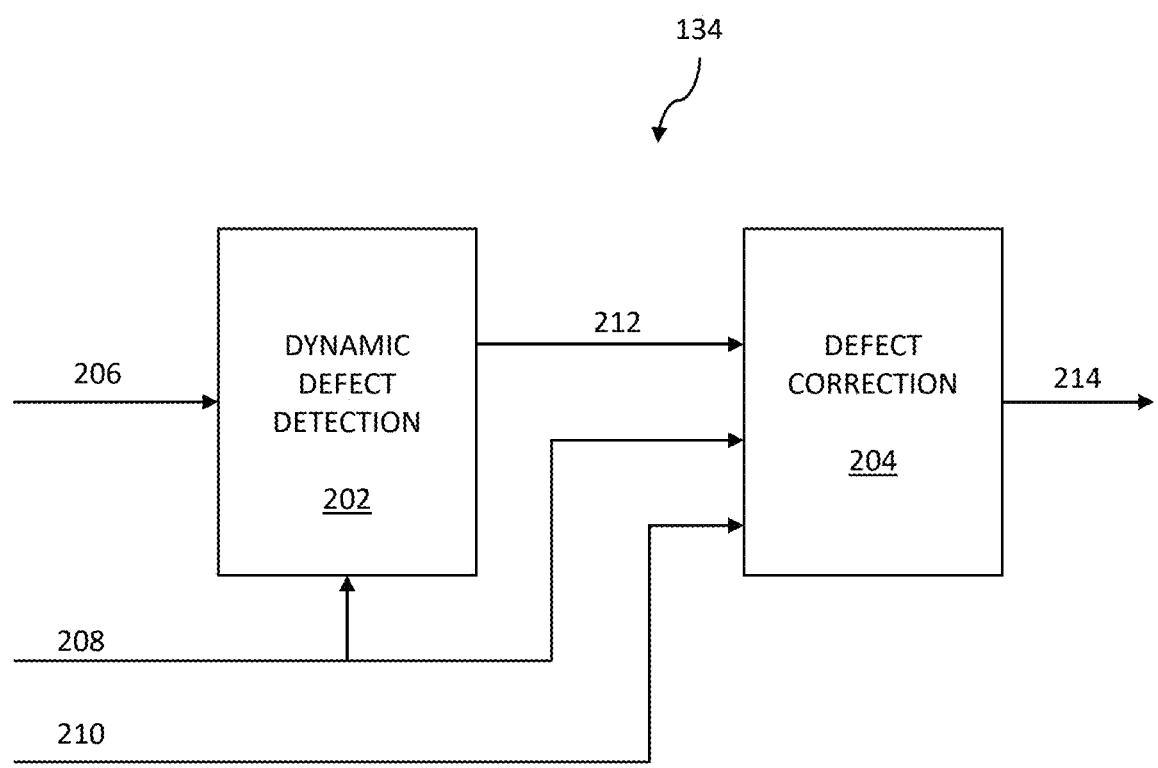
FIG. 2 is a block diagram of an example of defect detection and correction circuitry, in accordance with aspects of the present disclosure.

Referring to FIG. 2, there is illustrated a block diagram of the defect detection and correction circuitry 134 according to one example. In the illustrated example, the defect detection and correction circuitry 134 includes a dynamic defect detection component 202 and a defect correction component 204. The dynamic defect detection component 202 may be configured to detect dynamic defects in the pixel array 110. The defect correction component 204 can be configured to apply corrections for dynamic and/or mapped defects, as described further below.

The dynamic defect detection component 202 receives an input signal 206. In some examples, the input signal 206 includes a matrix of pixel output values from a pixel-under-test, also referred to herein as a pixel-under-correction (PUC), and surrounding pixels 112 in the pixel array 110. The dynamic defect detection component 202 may further receive a first enable signal 208 (Dynamic_DC_EN) that indicates whether or not a dynamic defect correction process is enabled for the current PUC. For example, the first enable signal 208 may be a binary signal having a logical 1 ("HIGH") value to indicate that dynamic defect correction is enabled or a logical 0 ("LOW") value to indicate that dynamic defect correction is disabled (or vice versa). If dynamic defect correction is enabled, the dynamic defect detection component 202 may perform a dynamic defect detection process based on the input signal 206, as described further below.

According to certain examples, the defect correction component 204 receives the first enable signal 208 and a first information signal 210. The first information signal 210 may include at least two pieces of information used by the defect correction component 204. In some examples, the first information signal 210 includes a second enable signal (Mapped_DC_EN) that indicates whether or not a mapped defect correction process is enabled, along with a mapped flag signal (mapped_flag) that indicates whether or not the PUC has a mapped defect. For example, the second enable signal may be a binary signal having a logical 1 value to indicate that mapped defect correction is enabled or a logical 0 value to indicate that mapped defect correction is disabled (or vice versa). Similarly, the mapped flag signal may be a binary signal having a logical 1 value to indicate that PUC has a mapped defect or a logical 0 value to indicate that PUC does not have a mapped defect (or vice versa). In some examples, the second enable signal and the mapped flag signal may be expressed through multiple bits of the same signal. In other examples, the second enable signal and the mapped flag signal are separate signals. In other examples, the second enable signal may be eliminated, and the defect correction process for mapped defects may be enabled or disabled based on the status of the mapped flag signal. For example, if the mapped flag signals that the PUC does not have a mapped defect (e.g., mapped_flag=0), the defect correction process may be enabled or disabled depending on whether or not the dynamic defect detection component 202 detects that the PUC has a dynamic defect. On the other hand, if the mapped flag signal indicated that the PUC has a mapped defect (e.g., mapped_flag=1), defect correction may be enabled. Thus, the first information signal 210 may represent a single signal or multiple signals. The mapped flag signal may be obtained from (or may contain information obtained from) a memory or other computer-readable storage medium that stores information identifying pixels (e.g., by location in the array) in the pixel array 110 that have mapped defects.

In some examples, the defect correction component 204 receives, from the dynamic defect detection component 202, a second information signal 212 that contains information to be used by the defect correction component 204 in a defect correction process. In some examples, the second information signal 212 includes at least three pieces of information. For example, the second information signal 212 may include the original output value from the PUC (original_PUC). The second information signal 212 may further include an ordered list of output values from the pixels surrounding the PUC. Thus, in some examples, the second information signal may include information corresponding to that contained in the input signal 206, optionally presented in a different format. The second information signal 212 may further include a dynamic detection flag signal (dynamic_flag) that indicates a result of the dynamic defect detection process implemented by the dynamic defect detection component 202 for the current PUC. For example, the dynamic detection flag signal may be a binary signal having a logical 1 value to indicate that PUC has a dynamic defect or a logical 0 value to indicate that PUC does not have a dynamic defect (or vice versa). In some examples, the second information signal 212 may further include information specifying a number of mapped defects present in the group of pixels surrounding the PUC. In some examples, the information contained in the second information signal 212 may be represented through multiple bits of the same signal. In other examples, the second information signal 212 may represent multiple different signals, each containing some of the above-described information to be used by the defect correction component 204.

Based on the information obtained from the first and second information signals 210, 212, the defect correction component 204 produces an output signal 214 that includes an output value for the PUC. If defect correction is enabled, and one or both of the mapped flag and/or dynamic detection flag signals indicate that the PUC has a defect, the defect correction component 204 may perform a defect correction process (examples of which are described below), and the output signal 214 may specify a corrected value for the PUC (corrected_PUC). If defect correction is not enabled, or no defect is detected, the output signal 214 may specify the original output value for the PUC (original_PUC), obtained via the input signal 206. Table 1 below provides examples of the output signal 214 for different circumstances represented by logical values of the first and second enable signals, the mapped flag signal, and the dynamic detection flag signal.

TABLE 1

| Enable Signal Status | Flag Status | Output signal 214 |
| --- | --- | --- |
| Mapped_DC_EN = 0<br>Dynamic_DC_EN = 0 | N/A | original_PUC |
| Mapped_DC_EN = 1<br>Dynamic_DC_EN = 0 | mapped_flag = 0<br>mapped_flag = 1 | original_PUC<br>corrected_PUC |
| Mapped_DC_EN = 0<br>Dynamic_DC_EN = 1 | dynamic_flag = 0<br>dynamic_flag = 1 | original_PUC<br>corrected_PUC |
| Mapped_DC_EN = 1<br>Dynamic_DC_EN = 1 | mapped_flag and dynamic_flag = 0<br>mapped_flag or dynamic_flag = 1 | original_PUC<br>corrected_PUC |

Example Methodologies

Figure 3:
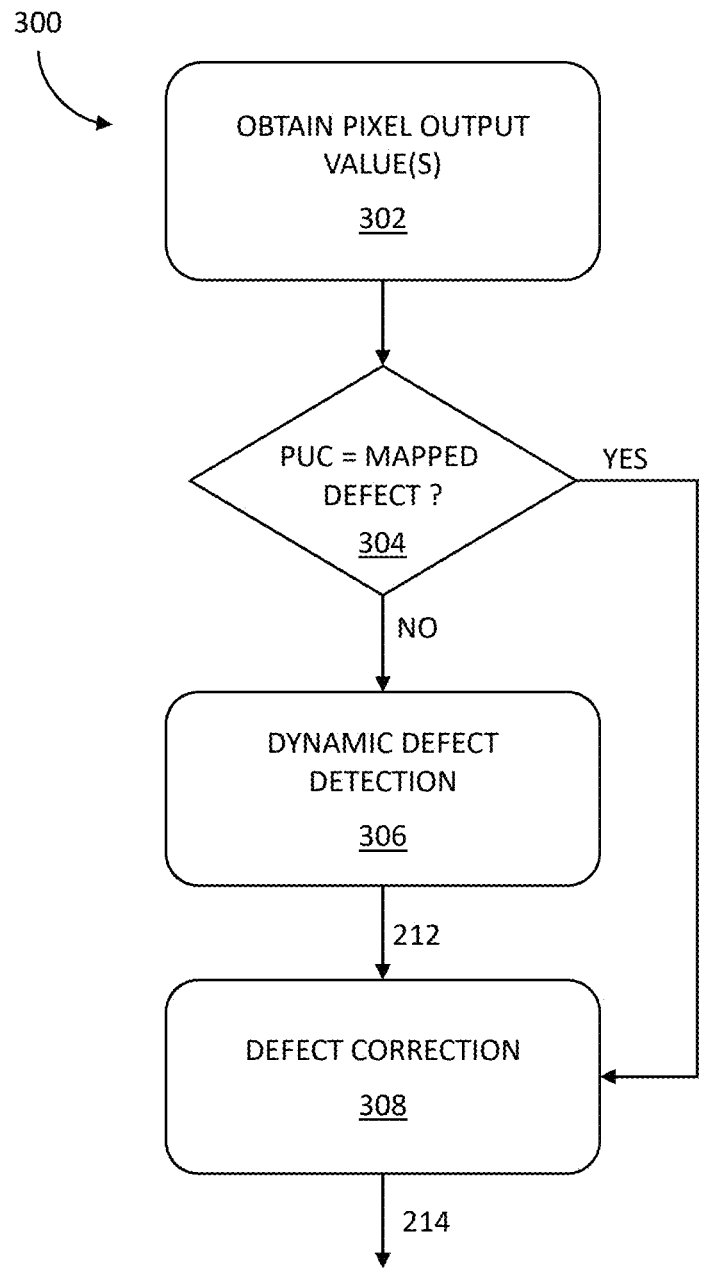
FIG. 3 is a flow diagram of an example of a method of defect detection and correction, in accordance with aspects of the present disclosure.

FIG. 3 is a flow diagram of a process 300 for defect detection and correction according to one example. The process 300 may be implemented by the processor 130, for example, the by defect detection and correction circuitry 134. The process 300 may be repeated for some or all pixels 112 in the pixel array 110. In some examples, the process 300 may be performed for two or more pixels 112 in parallel. In other examples, the process 300 may be performed sequentially, pixel-by-pixel, through the pixel array 110.

Figure 4A:
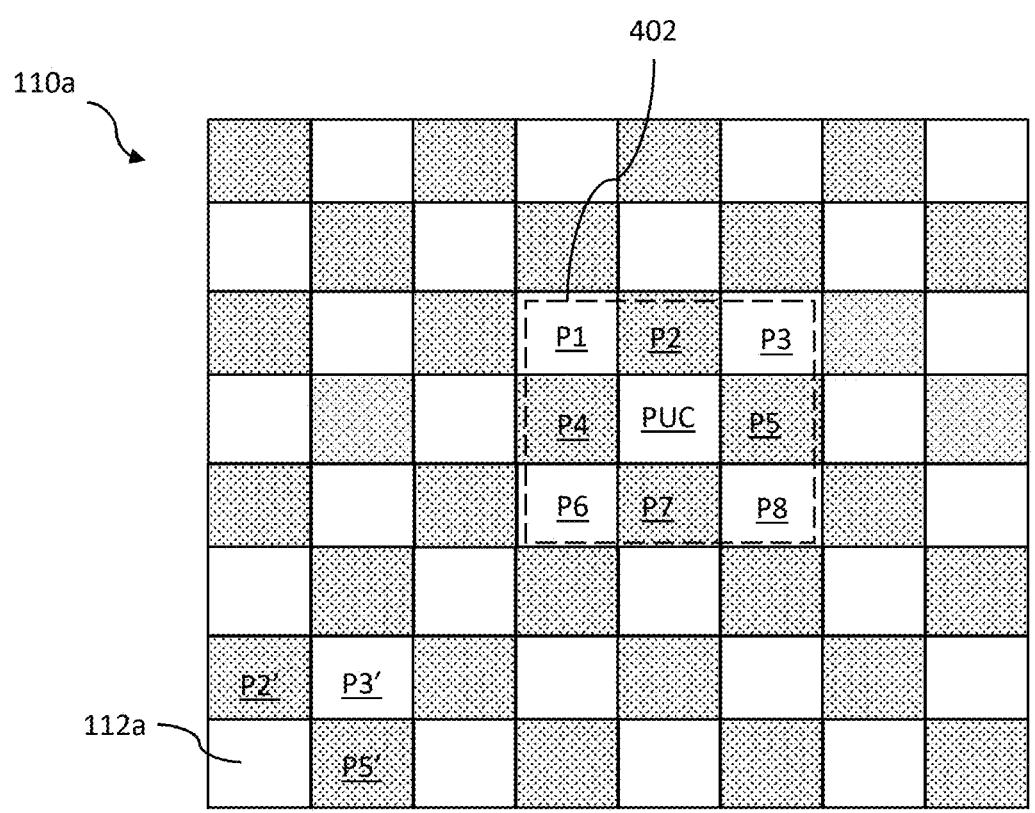
FIG. 4A is a diagram illustrating one example of a pixel array, in accordance with aspects of the present disclosure.

At operation 302, the dynamic defect detection component 202 may receive the input signal 206 specifying the output values for a group of pixels, including the current PUC and surrounding pixels of the same type. FIGS. 4A and 4B illustrate two examples (110a in FIGS. 4A and 110b in FIG. 4B) of the pixel array 110, showing a group of pixels 402 including the pixel-under-correction (PUC) and surrounding pixels, P1 to P8. In selecting the surrounding pixels P1-P8 to form the group 402, it may be preferable that the surrounding pixels are of the same type, or have the same color filter, as the PUC. In some instances, the pixel array 110a may be a monochromatic array, or may have a color pattern suitable for the eight pixels directly adjacent to the PUC to be used in the group 402, as shown in FIG. 4A. FIG. 4B illustrates another example in which the pixel array 110b is a color array having pixels with four different color filters, namely red (R), blue (B), light green (LG), and dark green (DG). In this example, since the PUC is a light green pixel, the eight closest surrounding light green pixels P1-P8 are selected to form the group 402, as shown. Thus, at operation 302, the dynamic defect detection component 202 may receive the input signal 206 specifying the original output value of the PUC and the output values of the surrounding eight pixels, P1-P8.

Referring again to FIG. 3, the process 300 may include, at operation 304, determining whether or not the current PUC has a mapped defect. As described above, in some examples, the locations of pixels 112 with mapped defects can be recorded during a prior operation (e.g., a testing or calibration procedure) and stored in a computer-readable storage medium that is accessible to the processor 130. Accordingly, at operation 304, the processor 130 may access the storage medium (e.g., memory 904 or storage system 912 described below) to determine whether or not the current PUC has a mapped defect. If the current PUC does have a mapped defect, the process 300 may proceed to operation 308 to perform defect correction. If the current PUC does not have a mapped defect, and dynamic defect correction is enabled (e.g., as indicated by the first enable signal 208, such as Dynamic_DC_EN=1), the process 300 may proceed to operation 306 to perform dynamic defect detection.

Thus, at operation 306, the dynamic defect detection component 202 may perform a dynamic defect detection process based on the input signal 206, as described further below with reference to FIGS. 5 and 6, and with continuing reference to FIGS. 4A and 4B. When the dynamic defect detection process at operation 306 is complete for the current PUC, the dynamic defect detection component may provide the second information signal 212 to the defect correction component 204, as described above.

Accordingly, in some examples, at operation 308, the defect correction component 204 performs a defect correction process, as described further below with reference to FIGS. 7 and 8A-F, and with continuing reference to FIGS. 4A and 4B. In some examples, the defect correction process 308 may be performed by the defect correction component 204 if defection correction is enabled (e.g., Dynamic_DC_EN=1 or Mapped_DC_EN=1) and the PUC has either a mapped defect of a dynamic defect (e.g., mapped_flag=1 or dynamic_flag=1). When the defect correction process at operation 308 is complete for the current PUC, the defect correction component may output the corrected output value (corrected_PUC) for the current PUC, as described above.

In some examples, the process 300 may be repeated for each image frame acquired by the image sensor 100. In other examples, the process 300 may be repeated periodically (e.g., for every nth image frame, or at certain time intervals during operation of the image sensor 100), or in response to a change in the imaging conditions (e.g., if the integration time is changed, the ambient light in the imaged scene changes significantly, sensor and/or ambient temperature changes significantly, or if sensor parameters, such as analog or digital gain are changed).

Figure 5:
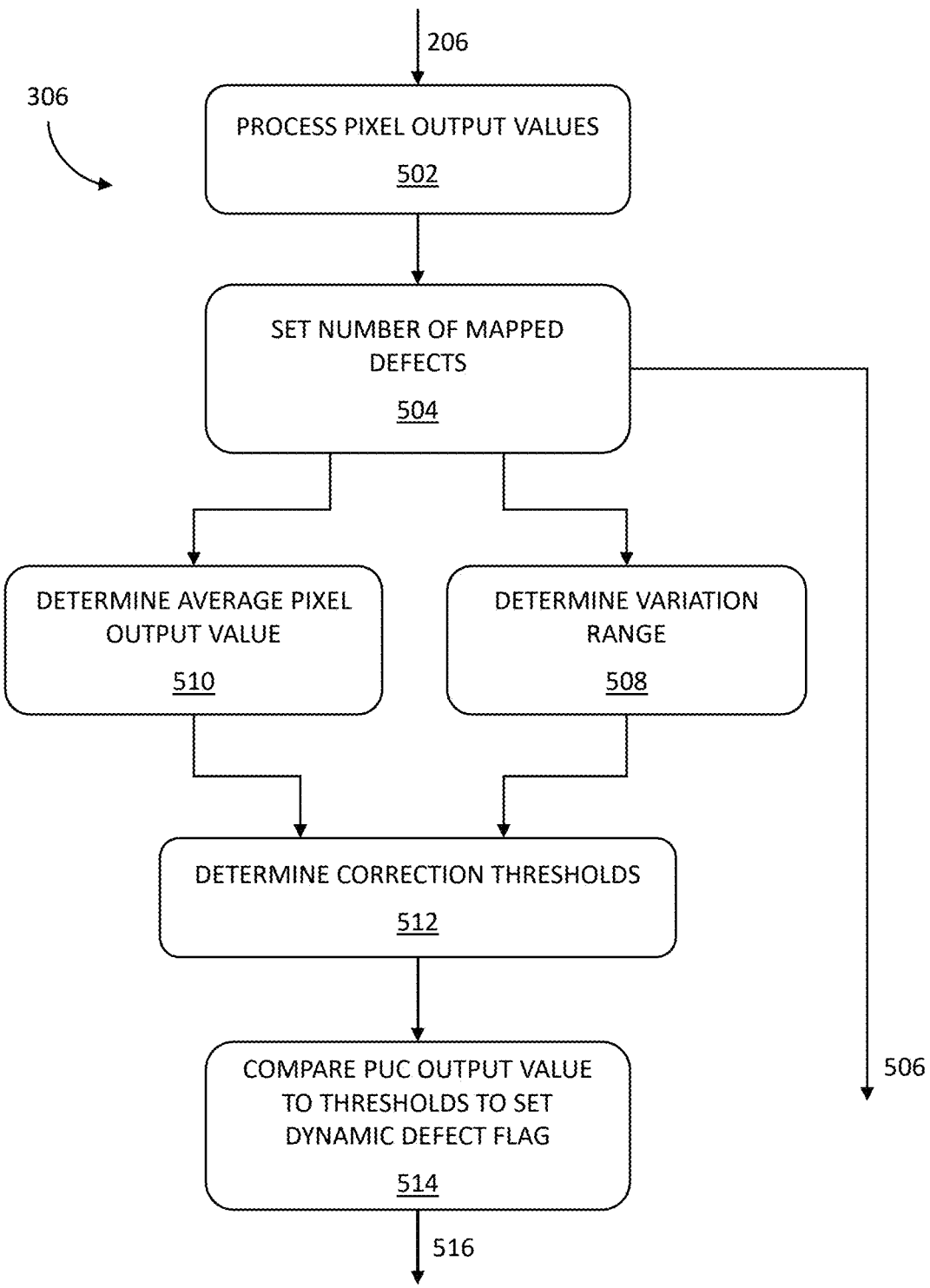
FIG. 5 is a flow diagram of an example of a method of dynamic defect detection, in accordance with aspects of the present disclosure.
Figure 6:
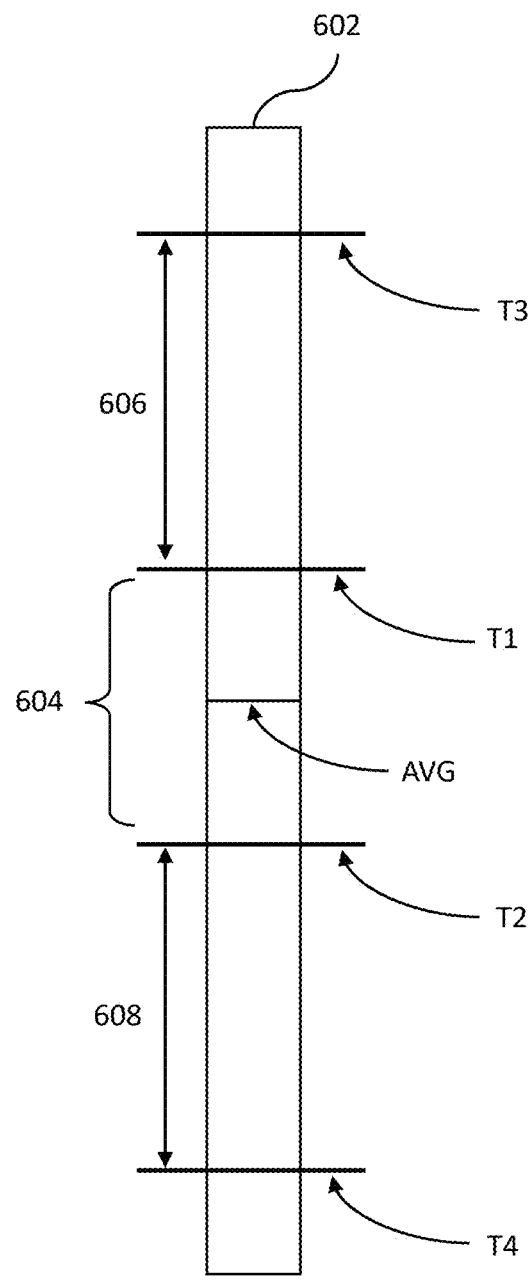
FIG. 6 is a diagram illustrating an example of defect detection ranges, in accordance with aspects of the present disclosure.

Referring now to FIG. 5, there illustrated a flow diagram for an example of the dynamic defect detection process 306. As described above, the dynamic defect detection component 202 receives the input signal 206, which in some examples, is a 3×3 matrix describing the pixel output values for the group of pixels 402 (the current PUC and the eight surrounding pixels P1-P8 of the same type as the PUC). The dynamic defect detection process 300 may use the output values from the surrounding pixels P1-P8 to compare the output value from the current PUC, and determine whether or not the PUC output value is within a "normal" range, based on the surrounding pixels, or is abnormally high (bright) or low (dark), in which case, correction may be implemented.

According to some examples, at operation 502, the output values of the surrounding pixels P1-P8 are processed and sorted to assign the maximum output value among the pixels P1-P8 (PM), the second maximum output value (PH), the minimum output value (PN), and the second minimum output value (PL). In some instances, one or more of the surrounding pixels P1-P8 may have mapped defects. In such instances, these one or more pixels may be assigned the maximum output value, PM. In some examples, the maximum value, PM, and the minimum value, PN, are not used for dynamic defect detection. Rather, the second maximum, PH, and the second minimum, PL, may be used instead, as described further below. In some examples, the assigned output value information (e.g., which pixels P1-P8 correspond to PM, PN, PH, and PL) may be included in the second information signal 212 provided from the dynamic defect detection component 202 to the defect correction component 204.

At operation 504, the number of pixels in the group 402 with mapped defects may be recorded. In some instances, this information can be recorded using one or more flags that can be set depending on the number of mapped defects in the group 402. In some examples, a first flag (singlet_flag) is set to logical 1 if none of the surrounding pixels P1-P8 has a mapped defect. The condition singlet_flag=1 may thus indicate that the group 402 contains the potential for a single defect, namely the PUC. In some examples, if one of the surrounding pixels P1-P8 has a mapped defect, a second flag (couplet_flag) is set to logical 1. The condition couplet_flag=1 may thus indicate that the group 402 contains the potential for two defects, namely the pixel with the mapped defect and the PUC. If more than two of the surrounding pixels P1-P8 has a mapped defect, the number of defects (num_defects) can be recorded as an integer number, N (e.g., num_defects=N). In such instances, the first or second flags may be set to logical zero (e.g., singlet_flag=0 and couplet_flag=0). Thus, the dynamic defect detection component 202 may supply defect information 506 to the defect correction component 204, the defect information 506 including the values of the first and second flags (e.g., 1 or 0) and/or the value of N. In some examples, the defect information 506 is included in the second information signal 212.

Referring again to FIG. 4A, in some instances, a current PUC 112a may be an edge pixel, as shown. In such instances, the pixel 112a does not have eight surrounding pixels. For example, in the case illustrated in FIG. 4A, there are only three available surrounding pixels P2', P3', and P5' for the PUC 112a. FIG. 4B illustrates another edge condition, in which a current PUC 112b is a red edge pixel positioned such that there are five available surrounding red pixels, P1", P2", P3", P4", and P5". Various other edge conditions may occur in which the current PUC has fewer than eight surrounding pixels of the same type, depending on the position of the PUC in the pixel array 110 and/or the type of array (e.g., the type of color filter pattern). According to certain examples, in any such edge conditions, where there are fewer than eight available surrounding pixels to form the group 402, the "missing" pixels (e.g., P6", P7", and P8" in the example of FIG. 4B) are designated as pixels having mapped defects, and treated accordingly. Thus, the dynamic defect detection process 306 and defect correction process 308 may proceed based on a number of pixels with mapped defects (N) that includes any "missing" pixels.

Returning to FIG. 5, at operation 508, the second maximum pixel output value, PH, and the second minimum pixel output value, PL, may be used to set a range of variation within which a correct output value from the PUC may be expected to fall. In some examples, at operation 508, a difference value, Diff, is calculated as the difference between the second maximum value, PH, and the second minimum value, PL (Diff=PH−PL). Using the second maximum and minimum values (PH and PL) instead of the maximum and minimum values (PM and PN) may allow the dynamic defect detection component to implement a less aggressive approach to defect detection, and exclude possible outliers (e.g., an abnormally high PM or abnormally low PN) that could otherwise cause the defect detection and correction circuitry 134 potentially to over-correct a current PUC and degrade the resulting image quality.

At operation 510, an average pixel output value for the group 402 (AVG) may be calculated based on the output values of the remaining surrounding pixels in the group 402 (e.g., those pixels P1-P8 that have not been assigned to any of PM, PN, PH, or PL). Thus, in an example in which none of the eight surrounding pixels has a mapped defect, there are four remaining surrounding pixels, and the average value can be calculated as follows:

$$AVG=((P1+P2+P3+P4+P5+P6+P7+P8)-(PM+PN+PH+PL))/4 \quad (1)$$

As described above, in some cases, one or more of the surrounding pixels may have a mapped defect, or may be "missing" due to an edge condition and therefore considered as having a mapped defect, in which case, there may be fewer than four remaining pixels from which to calculate the average value. Accordingly, Equation (1) for calculating the average value can be adjusted appropriately (e.g., to divide by 3 instead of 4 if there are three remaining pixels instead of four).

At operation 512, one or more thresholds can be calculated to determine whether or not the PUC should be classified as having a dynamic defect such that defect correction should be applied. According to certain examples, upper and lower boundary thresholds can be set such that is the original output value is above the upper boundary threshold or below the lower boundary threshold, no correction is applied. This approach may avoid over-correction in the event of outliers in the measurements. For example, in the case of astrophotography, an image may be acquired of one or more stars in the night sky. Individual stars may be captured by only a single pixel in some cases, with the surrounding pixels imaging the dark sky surrounding the star. As a result, in such an example, the PUC may appear very bright compared to the surrounding pixels; however, this is not a defect but represents an actual occurrence in the imaged scene. By setting an upper boundary threshold for defect detection/correction, one may avoid improperly "correcting" the bright PUC in such examples.

As described above, the response of pixels 112 to incident light may vary based on factors such as temperature, analog gain in the image sensor 100, digital gain in the image sensor 100, and/or the integration time used to capture the image frame. Further, the appearance and/or significance (e.g., how noticeable) of dynamic defects can also be influenced by these factors. For example, "blooming," a defect in which a pixel is noticeably brighter than it should be based on the intensity of the incident light, may be related to longer integration time and/or higher gain (analog and/or digital), and sometimes to higher temperature. Accordingly, operation 512 may include setting the defect detection thresholds based in part on a detection factor (detection_factor) that takes these factors into account.

In some examples, the detection factor may be set according to Equation (2) below:

$$\text{detection\_factor}=DF\_reg+\text{sqrt}(IT\_ratio*AG\_ratio*DG\_ratio) \quad (2)$$

In Equation (2), DF_reg is a programmable offset value that can be programmed to a selected value based on the sensor array being used and/or the noise model used to estimate the impact the various factors (such as temperature, gain, and/or integration time) may have on the response of the pixels 112 in the pixel array 110. Further in Equation (2), IT_ratio is the ratio of integration time, AG_ratio is the ratio of analog gain, and DG_ratio is the ratio of digital gain. The ratios may be determined as follows, during a calibration procedure, for example. A default value for a particular parameter under test (e.g., integration time, analog gain, or digital gain) can be selected, and an image frame acquired using the image sensor 100 configured with the parameter set to the default value. For example, for integration time, a default value may be 10 milliseconds (ms). The value of the parameter under test may be gradually increased, and further images acquired at various different values, until the image frame begin to exhibit noticeable defects. The value at which the defects begin to occur, referred to herein as the limit value, may be recorded. For example, for integration time, the limit value may be 30 ms in some instances. The ratio for the particular parameter may then be determined by the limit value divided by the default value. Thus, for the above example of integration time, the ratio is 30 ms divided by 10 ms, and thus IT_ratio=3. Ratios may be similarly determined for analog gain and digital gain. The detection factor may be calculated using the square root of the product of the ratios (as shown in Equation (2) above), with the square root being selected to "smooth" the defect detection thresholds such that variation from frame to frame is more gradual.

According to certain examples, operation 512 includes determining four thresholds based on the average pixel output value (AVG) determined at operation 510, the difference value (Diff) determined at operation 508, and/or the detection factor determined at operation 512. In some examples, a first threshold, T1, and a second threshold, T2, are determined based on the average output value and the difference value, according to Equations (3) and (4) below.

$$T1=AVG+(Diff*Sensitivity+Offset) \quad (3)$$

$$T2=AVG-(Diff*Sensitivity+Offset) \quad (4)$$

In Equations (3) and (4), Sensitivity is a programmable value that can be selected based on the pixel array 112 used in a given implementation, and describes the sensitivity of the array to incident light. "Offset" is a programmable value that can be used to adjust the "aggressiveness" of the defect detection, as described further below. The first and second thresholds, T1, T2, are thus symmetric about the average output value, AVG.

As described above, operation 512 may further include calculating upper and lower boundary thresholds. In some examples, these upper and lower boundary thresholds, T3 and T4, respectively, are determined according to Equations (5) and (6) below.

$$T3=AVG+(Diff*detection\_factor+detection\_offset) \quad (5)$$

$$T4=AVG-(Diff*detection\_factor+detection\_offset) \quad (6)$$

In Equations (5) and (6), detection_offset is a programmable value that can be selected to adjust the upper and lower boundary thresholds. For example, information gathered over multiple image frames may indicate that the boundary thresholds are too high or too low (e.g., if an excessive number of pixels are being corrected each frame, or if the resulting output image quality is not satisfactory). The detection_offset value can then be altered based on such information, to adjust the boundary thresholds, T3 and T4.

At operation 514, the original output value from the PUC can be compared to the various thresholds determined at operation 512, and the dynamic detection flag set accordingly. For example, referring to FIG. 6, the thresholds T1-T4 calculated at operation 512 can be used to set ranges for pixel output values that will and will not correspond to a detected defect, and thus will or will not trigger correction to be applied. In FIG. 6, a range of output values for the PUC is represented by bar 602. In some examples, the first and second thresholds, T1 and T2, define a first range 604 about the average value, AVG, as described above. In some examples, if the original output value 602 of the PUC falls within the first range 604, the output value can be considered "normal" such no correction is required (e.g., the PUC does not have a dynamic defect). Accordingly, at operation, the dynamic detection flag can be set to logical 0, for example (dynamic_flag=0), indicating that no defect has been detected. In some examples, if the output value 602 of the PUC falls in a second range 606 between the first threshold, T1, and the upper boundary threshold, T3, the PUC can be considered to have a dynamic defect, and the dynamic detection flag can be set to logical 1 (e.g., dynamic_flag=1), indicating that defect correction may be applied. Similarly, if the output value 602 of the PUC falls in a third range 608 between the second threshold, T2, and the lower boundary threshold, T4, the PUC can be considered to have a dynamic defect, and the dynamic detection flag can be set to logical 1 (e.g., dynamic_flag=1), indicating that defect correction may be applied. If the output value 602 of the PUC is either above the upper boundary threshold, T3, or below the lower boundary threshold, T4, no correction may be applied, and therefore, the dynamic detection flag may be set to logical 0 (e.g., dynamic_flag=0).

Thus, referring again to FIG. 5, the dynamic defect detection component 202 may provide an output signal 516 that includes the dynamic detection flag (e.g., dynamic_flag=0 or dynamic_flag=1), to indicate to the defect correction component 204 whether or not correction is needed for the current PUC. In some examples, the output signal 516, and the defect information 506, may be part of the second information signal 212 provided from the dynamic detection component 202 to the defect correction component 204.

Figure 7:
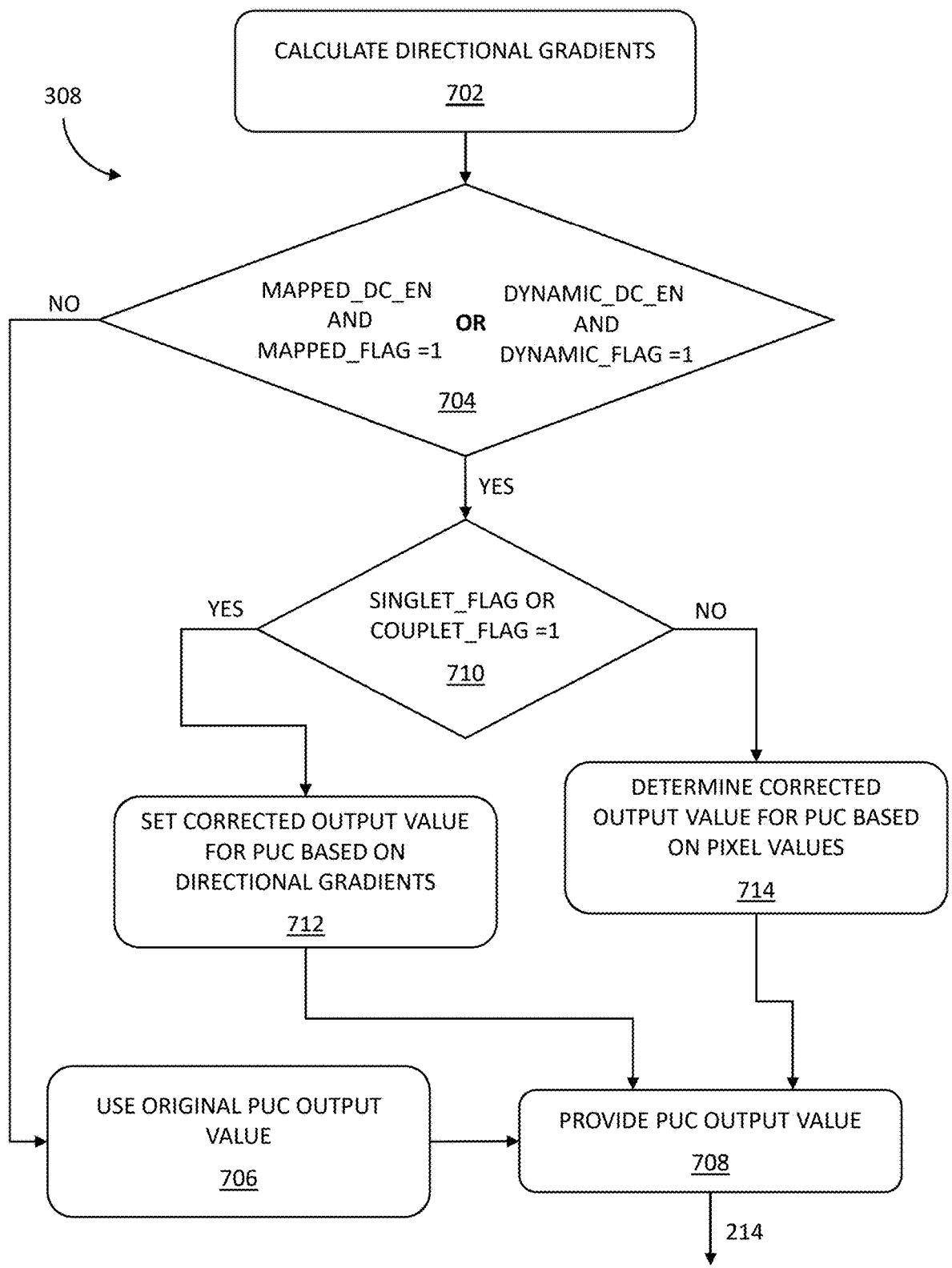
FIG. 7 is a flow diagram of an example of a method of defect correction, in accordance with aspects of the present disclosure.

Referring now to FIG. 7, there is illustrated a flow diagram of an example of the defect correction process 308.

As described above, the defect correction process 308 may involve using the output values from one or more of the surrounding pixels P1-P8 to provide a corrected output value for the PUC when the PUC has either a mapped defect or a dynamic defect.

According to certain examples, defect correction is based on calculated sums of absolute distances (SADs), referred to as directional gradients, between pairs of the pixels P1-P8 surrounding the PUC. Accordingly, at operation 702, a set of directional gradients can be calculated for the pixels P1-P8 in the group 402. In some examples, the set of directional gradients includes a horizontal gradient, a vertical gradient, and a pair of diagonal gradients. The directional gradients can be calculated based on the absolute value of differences between the output values of pairs of (preferably) adjacent pixels (excluding the PUC) in the direction of the gradient. Thus, for example, the horizontal gradient can be calculated by comparing the output values of between pairs of adjacent pixels in the horizontal direction (e.g., P1 and P2, which, as may be seen with reference to FIG. 4A or 4B, are adjacent in the horizontal direction). Further, the directional gradients may exclude any pixels in the group 402 that have a mapped defect. As described above, the defect correction component 204 may receive the first information signal 210 that may specify which pixels in the group 402, if any, have a mapped defect. Accordingly, this information can be used to exclude the output values from any pixels with mapped defects from being used in calculating the direction gradients. To account for the absence of a mapped pixel, the calculation for the directional gradient may be adjusted, as shown below, for example. In the following calculations, a pixel having a mapped defect is referred to as being "mapped," the pixel identifiers (e.g., P1, P2, etc.) refer to the output values from the respective pixel, and the operator "abs" indicates absolute value.

In some examples, the horizontal gradient (HG) is calculated as follows:

$HG\_normal=abs(P2-P1)+abs(P3-P2)+abs(P7-P6)+abs(P8-P7);$ if P1 is mapped, HG_a=abs(P3-P2)+abs(P3-P2)+abs(P7-P6)+abs(P8-P7);
if P2 is mapped, HG_b=abs(P3-P1)+abs(P3-P1)+abs(P7-P6)+abs(P8-P7);
if P3 is mapped, HG_c=abs(P2-P1)+abs(P2-P1)+abs(P7-P6)+abs(P8-P7);
if P6 is mapped, HG_d=abs(P2-P1)+abs(P3-P2)+abs(P8-P7)+abs(P8-P7);
if P7 is mapped, HG_e=abs(P2-P1)+abs(P3-P2)+abs(P8-P6)+abs(P8-P6); or
if P8 is mapped, HG_f=abs(P2-P1)+abs(P3-P2)+abs(P7-P6)+abs(P7-P6).

In some examples, the vertical gradient (VG) is calculated as follows:

$VG\_normal=abs(P4-P1)+abs(P6-P4)+abs(P5-P3)+abs(P8-P5);$ if P1 is mapped, VG_a=abs(P6-P4)+abs(P6-P4)+abs(P5-P3)+abs(P8-P5);
if P4 is mapped, VG_b=abs(P6-P1)+abs(P6-P1)+abs(P5-P3)+abs(P8-P5);
if P6 is mapped, VG_c=abs(P4-P1)+abs(P4-P1)+abs(P5-P3)+abs(P8-P5);
if P3 is mapped, VG_b=abs(P4-P1)+abs(P6-P4)+abs(P8-P5)+abs(P8-P5);
if P5 is mapped, VG_e=abs(P4-P1)+abs(P6-P4)+abs(P8-P3)+abs(P8-P3); or if P8 is mapped, VG_f=abs(P4−P1)+abs(P6−P4)+abs(P5−P3)+abs(P5−P3).

In some examples, the first diagonal gradient in one diagonal direction (e.g., the "forward" diagonal; DFG) is calculated as follows:

$$DFG\_normal=(abs(P4-P2)+abs(P7-P5))*2;$$

if P2 or P4 is mapped, DFG_a=(abs(P7−P5))*4; or
if P7 or P5 is mapped, DFG_b=(abs(P4−P2))*4.

In some examples, the second diagonal gradient in the other diagonal direction (e.g., the "backward" diagonal; DBG) is calculated as follows:

$$DBG\_normal=(abs(P5-P2)+abs(P7-P4))*2;$$

if P2 or P5 is mapped, DFG_a=(abs(P7−P4))*4; or
if P4 or P7 is mapped, DFG_b=(abs(P5−P2))*4.

Referring again to FIG. 7, at operation 704, the process 308 may proceed based on the status of the mapped flag (e.g., mapped_flag=0 or 1), the dynamic defect detection flag (e.g., dynamic_flag=0 or 1), and the first and second enable signals (e.g., Mapped_DC_EN=0 or 1, and/or Dynamic_DC_EN=0 or 1). For example, operation 704 may include determining whether the PUC has either a mapped defect or a dynamic defect, and whether or not correction is enabled. Thus, as illustrated in FIG. 7, if mapped defect correction is enabled (Mapped_DC_EN=1) and the PUC has a mapped defect (mapped_flag=1), the process 308 may proceed to a next step of defect correction. Alternatively, if dynamic defect correction is enabled (Dynamic_DC_EN=1) and the PUC has a dynamic defect (dynamic_flag=1), the process 308 may similarly proceed to the next step of defect correction. If neither condition is met, the process 308 may proceed to operation 706, and the original output value of the PUC may be used (e.g., no correction is applied). Thus, at operation 708, the defect correction component 204 may supply, as the output signal 214, the original output value of the PUC.

In the example illustrated in FIG. 7, operation 702 of determining the direction gradients is shown occurring prior to operation 704. However, in other examples, operation 704 may be performed prior to operation 702.

If the PUC has a mapped or dynamic defect, and defect correction is enabled, at operation 710, the number of potential defects may be considered to select a defect correction sub-process. In some examples, if either the singlet flag or the couplet flag is set to logical 1, indicating that the group 402 of pixels includes one defect (PUC only) or two defects (PUC plus one of the surrounding pixels P1-P8), defect correction for the PUC may be performed based on the directional gradients determined at operation 702. If neither the singlet flag nor the couplet flag is set to logical 1, indicating that at least two of the surrounding pixels P1-P8 have mapped defects, defect correction for the PUC may be performed based on the output values of one or more of the surrounding pixels P1-P8, without using the directional gradients. Accordingly, in some examples, operation 702 of determining the directional gradients may be performed after operation 710, if the status of the singlet or couplet flags indicates that defect correction is to be applied using the directional gradients.

According to certain examples, at operation 712, the corrected output value for the PUC is determined based on the directional gradients determined at operation 702, according to the following process. In some examples, the four directional gradients, (HG, VG, DFG, BDG), which may be calculated according to the equations presented above, are evaluated to determine which gradient has the smallest value. The corrected output value of the PUC may then be determined based on the output values of the remaining pixels (e.g., those not used to determine the respective directional gradient) in the corresponding direction (the "deterministic direction").

For example, referring to FIG. 4A and/or FIG. 4B, if the horizontal gradient has the smallest value among the four directional gradients (the deterministic direction is the horizontal direction), the corrected value of the PUC can be calculated, as follows, based on the output values of pixels P4 and/or P5. For example, if neither P4 nor P5 has a mapped defect, the corrected output value for the PUC may be calculated as the average of the output values of pixels P4 and P5:

$$corrected\_PUC=(P4+P5)/2$$

If pixel P4 has a mapped defect, the output value from pixel P5 can be used as the corrected output value for the PUC. Similarly, if pixel P5 has a mapped defect, the output value from pixel P4 can be used as the corrected output value for the PUC. As described above, the system may maintain a record of those pixels having mapped defects, and may thus have knowledge of whether pixels P4 or P5 are mapped. Further, as noted above, since, in some examples, operation 712 is only performed if either the single flag or the couplet flag is set to logical 1, it is known that there is only one potential mapped defect in the group of pixels P1-P8, and therefore, P4 and P5 do not both have mapped defects.

If the vertical gradient has the smallest value among the four directional gradients, the corrected value of the PUC can be calculated, as follows, based on the output values of pixels P2 and/or P7. For example, if neither P2 nor P7 has a mapped defect, the corrected output value for the PUC may be calculated as the average of the output values of pixels P2 and P7:

$$corrected\_PUC=(P2+P7)/2$$

If pixel P4 has a mapped defect, the output value from pixel P5 can be used as the corrected output value for the PUC. Similarly, if pixel P5 has a mapped defect, the output value from pixel P4 can be used as the corrected output value for the PUC.

If the forward diagonal gradient has the smallest value among the four directional gradients, the corrected value of the PUC can be calculated, as follows, based on the output values of pixels P3 and/or P6. For example, if neither P3 nor P6 has a mapped defect, the corrected output value for the PUC may be calculated as the average of the output values of pixels P3 and P6:

$$corrected\_PUC=(P3+P6)/2$$

If pixel P3 has a mapped defect, the output value from pixel P6 can be used as the corrected output value for the PUC. Similarly, if pixel P6 has a mapped defect, the output value from pixel P3 can be used as the corrected output value for the PUC.

Similarly, if the backward diagonal gradient has the smallest value among the four directional gradients, the corrected value of the PUC can be calculated, as follows, based on the output values of pixels P1 and/or P8. For example, if neither P1 nor P8 has a mapped defect, the corrected output value for the PUC may be calculated as the average of the output values of pixels P1 and P8:

$$corrected\_PUC=(P1+P8)/2$$

If pixel P1 has a mapped defect, the output value from pixel P8 can be used as the corrected output value for the PUC.

Similarly, if pixel P8 has a mapped defect, the output value from pixel P1 can be used as the corrected output value for the PUC.

Thus, at operation 708, the defect correction component 204 may supply, as the output signal 214, the corrected output value of the PUC (corrected_PUC) determined at operation 712.

As described above, if there is more than one pixel among the group of surrounding pixels P-P8 with a mapped defect, the defect correction process 308 may use an alternate approach (instead of operation 712 based on the directional gradients) to determine a corrected output value for the PUC. In some instances, the presence of two or more mapped defects among the group of pixels P1-P8 may prevent appropriate calculation of one or more of the directional gradients, such that a deterministic direction cannot be found. Accordingly, it may be preferable to use another method to produce a corrected output value for the PUC. For example, at operation 714, the corrected output value for the PUC may be determined based on a median output value calculated from the output values of the surrounding pixels P1-P8 that do not have mapped defects. Examples of the process applied at operation 714, for different numbers of pixels with mapped defects, are described below with reference to FIGS. 8A-8H.

Referring to FIG. 8A, there is illustrated an example of a process applied at operation 714 if there are two pixels with mapped defects (referred to as defective pixels 802) among the group of pixels P1-P8 (e.g., num_defects=2). In this example, the output values (804a-f) of the remaining pixels are arranged as an ordered list from the highest (or lowest) valued pixel output 804a to the lowest (or highest) valued pixel output 804f. Since, in this example, the number of remaining pixels is even (six), the corrected output value 814 for the PUC can be determined based on the average value of the two pixel output values 804c, 804d closest to the median or middle of the list. Thus, as shown in FIG. 8A, an operator 806 can be applied to add the two middle remaining output values 804c, 804d, and divide the sum by 2 to determine the average. This value may then be used as the corrected output value 814 for the PUC. Thus, in this example, $$corrected\_PUC=(804c+804d)/2$$

FIG. 8B illustrates an example of the median average process (operation 714) applied when there are three defective pixels 802 (num_defects=3) among the group of pixels P1-P8. As described above, the output values 808a-e of the remaining (non-defective) pixels are arranged in an ordered list from highest to lowest output value (or vice versa). In this example, since the number of remaining pixels is odd, the middle remaining output value 808c may be used as the corrected output value 814.

FIG. 8C illustrates an example of operation 714 applied when there are four defective pixels 802 (num_defects=4) among the group of pixels P1-P8. In this case, as in the example shown in FIG. 8A, the two middle output values 810b and 810c from the ordered list of output values 810a-d of the remaining pixels are averaged (using operator 806) to provide the corrected output value 814 for the PUC.

FIG. 8D illustrates an example of operation 714 applied when there are five defective pixels 802 (num_defects=3) among the group of pixels P1-P8. In this example, as in the example of FIG. 8B, the middle output value 812b from the ordered list of output values 812a-c of the remaining pixels may be used as the corrected output value 814 for the PUC.

FIG. 8C illustrates an example of operation 714 applied when there are four defective pixels 802 (num_defects=4) among the group of pixels P1-P8. In this case, as in the example shown in FIG. 8A, the two middle output values 810b and 810c from the ordered list of output values 810a-d of the remaining pixels are averaged (using operator 806) to provide the corrected output value 814 for the PUC.

Figure 8E:
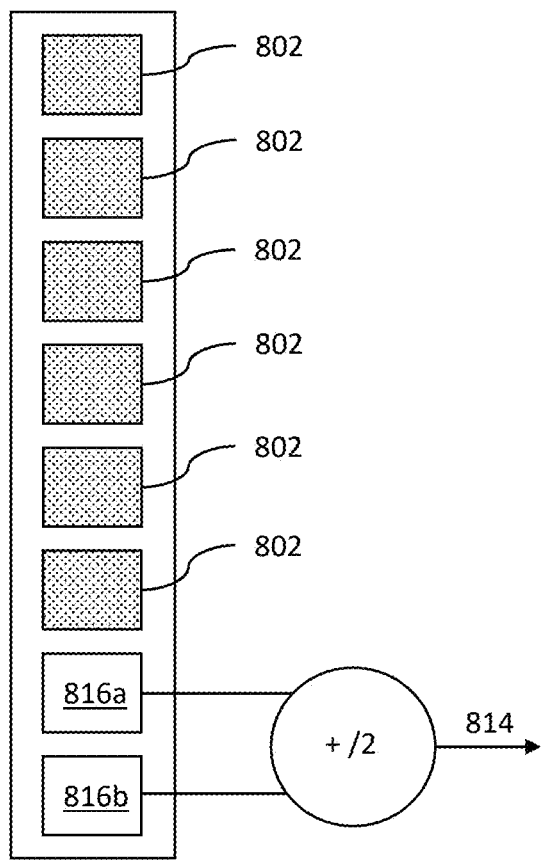

FIG. 8E illustrates an example of operation 714 applied when there are six defective pixels 802 (num_defects=6) among the group of pixels P1-P8. In this example, the average (determined using operator 806) of the output values 816a, 816b of the two remaining pixels may be used as the corrected output value 814 for the PUC.

Figure 8F:
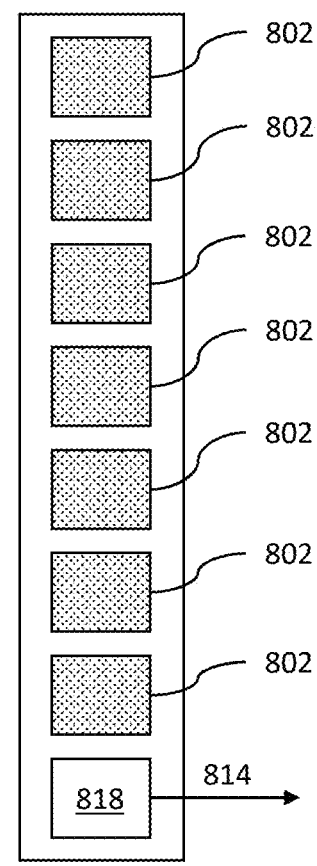

Referring to FIG. 8F, if seven of the eight surrounding pixels P1-P8 have mapped defects, the output value 818 of the sole remaining non-defective pixel may be used as the corrected output value 814 for the PUC.

Thus, at operation 708, the defect correction component 204 may supply, as the output signal 214, the corrected output value 814 of the PUC (corrected_PUC) determined at operation 714.

As described above, in some examples, if none of the surrounding pixels P1-P8 have mapped defects, or only one does, the defect correction process 308 may apply operation 712 to determine the corrected output value for the PUC based on the directional gradients. However, in other examples, the median average process of operation 714 may be applied instead. For example, operation 712 may be excluded and defect correction may be applied based on operation 714. In some examples, operation 712 may not produce a deterministic direction. For example, the horizontal, vertical, forward diagonal, and backward diagonal gradients may have the same value. Accordingly, if the directional gradient with the smallest value (deterministic direction) cannot be determined, operation 714 may be applied instead of operation 712.

Figure 8G:
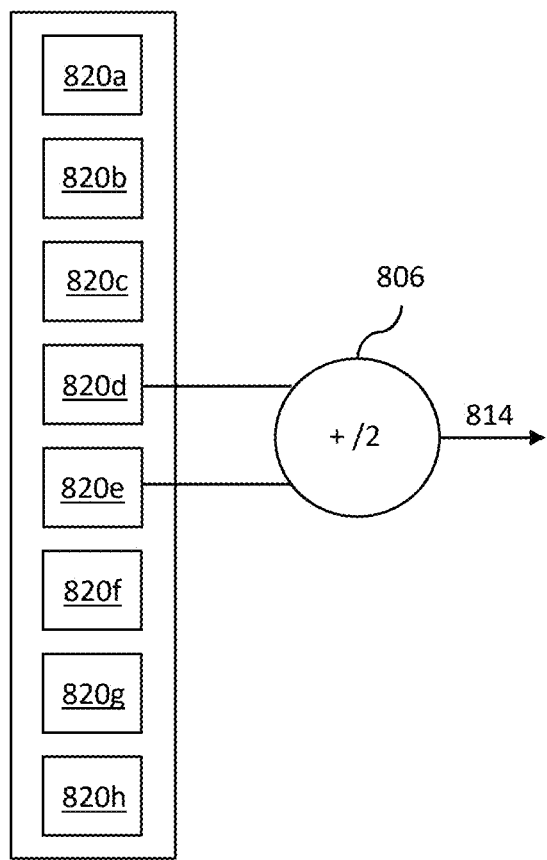

Referring to FIG. 8G, there is illustrated an example of operation 714 applied when there are no defective pixels among the group of pixels P1-P8. In this case, as described above, the output values 820a-h of the pixels P1-P8 are arranged in an ordered list from the highest (or lowest) output value 820a to the lowest (or highest) output value 820h. The corrected output value 814 for the PUC can be determined based on the average value (calculated at 806) of the two middle output values 820d, 820e, as shown and as described above.

Figure 8H:
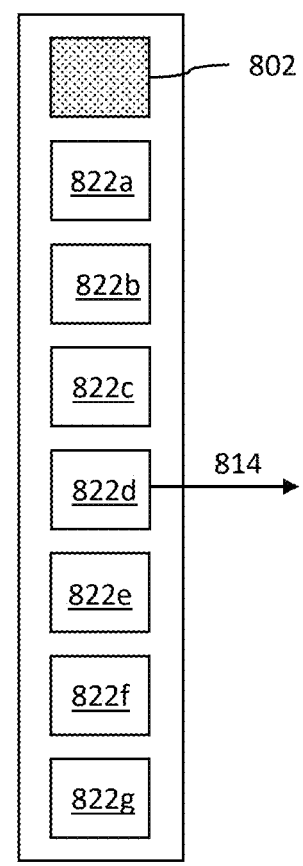

Similarly, FIG. 8H illustrates an example of operation 714 applied when there is a single defective pixel 802 among the group of pixels P1-P8. In this example, as in the examples of FIGS. 8B, 8D, and 8F described above, the median output value 822d (selected from the ordered list of output values 822a-g of remaining the non-defective pixels) can used as the corrected output value 814 of the PUC.

Thus, aspects and examples provide techniques for detecting pixels 112 that have dynamic defects, and for correcting pixels that have either a mapped defect or a dynamic defect.

Example Computing Platform

Figure 9:
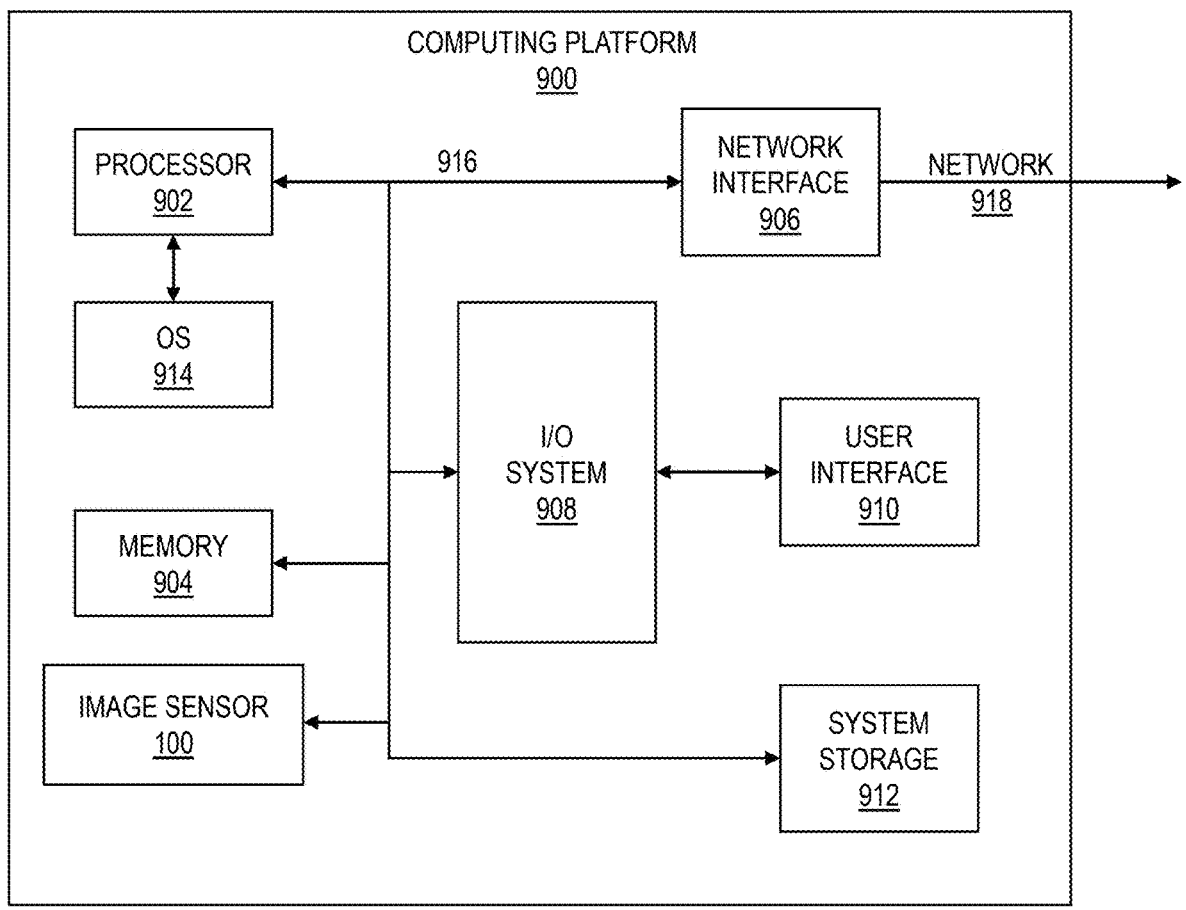
FIG. 9 is a block diagram of one example of a computing platform that may include the image sensor of FIG. 1, in accordance with aspects of the present disclosure.

FIG. 9 illustrates an example computing platform 900 that interfaces with the image sensor 100, configured in accordance with certain embodiments of the present disclosure. In some examples, the computing platform 900 may host, or otherwise be incorporated into a personal computer, workstation, server system, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), messaging device, data communication device, imaging device, wearable device, embedded system, and so forth. Any combination of different devices may be used in certain embodiments. The computing platform 900 may host a controlled area network (CAN) used on board a vehicle. In some embodiments, the computing platform 900 represents one system in a network of systems coupled together via a CAN bus.

In some examples, the computing platform 900 comprises any combination of a processor 902, a memory 904, a network interface 906, an input/output (I/O) system 908, a user interface 910, and/or a storage system 912. In some examples, one or more components of the image sensor 100 are implemented as part of the processor 902. In other examples, one or more of the components of the computing platform 900 may implement or form part of the processor 130. As shown in FIG. 9, a bus and/or interconnect is also provided to allow for communication between the various components listed above and/or other components not shown. The computing platform 900 can be coupled to a network 916 through the network interface 906 to allow for communications with other computing devices, platforms, or resources. Other componentry and functionality not reflected in the block diagram of FIG. 9 will be apparent in light of this disclosure, and it will be appreciated that other embodiments are not limited to any particular hardware configuration.

The processor 902 can be any suitable processor and may include one or more coprocessors or controllers to assist in control and processing operations associated with the computing platform 900. The processor 902 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. In some examples, the processor 902 includes, or may be part of, the processor 130 discussed above.

The memory 904 can be implemented using any suitable type of digital storage including, for example, flash memory and/or random access memory (RAM). In some examples, the memory 904 includes various layers of memory hierarchy and/or memory caches as are known to those of skill in the art. The memory 904 may be implemented as a volatile memory device such as, but not limited to, a RAM, dynamic RAM (DRAM), or static RAM (SRAM) device. The storage system 912 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some examples, the storage system 912 may comprise technology to increase the storage performance enhanced protection for valuable digital media when multiple hard drives are included.

The processor 902 may be configured to execute an Operating System (OS) 914 which may comprise any suitable operating system, such as Google Android (Google Inc., Mountain View, CA), Microsoft Windows (Microsoft Corp., Redmond, WA), Apple OS X (Apple Inc., Cupertino, CA), Linux, or a real-time operating system (RTOS). As will be appreciated in light of this disclosure, the techniques provided herein can be implemented without regard to the particular operating system provided in conjunction with the computing platform 900, and therefore may also be implemented using any suitable existing or subsequently-developed platform.

The network interface 906 can be any appropriate network chip or chipset which allows for wired and/or wireless connection between other components of the computing platform 900 and/or the network 616, thereby enabling the computing platform 900 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

The I/O system 908 may be configured to interface between various I/O devices and other components of the computing platform 900. I/O devices may include, but not be limited to, a user interface 910. The user interface 910 may include devices (not shown) such as a display element, touchpad, keyboard, mouse, and speaker, etc. The I/O system 908 may include a graphics subsystem configured to perform processing of images for rendering on a display element. For example, the I/O system 908 may be used to display the output image(s) acquired by the image sensor 100. The graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some examples, the graphics subsystem could be integrated into the processor 902 or any chipset of the computing platform 900.

In some examples, the various components of the computing platform 900 may be combined or integrated in a system-on-a-chip (SoC) architecture. In some examples, the components may be hardware components, firmware components, software components or any suitable combination of hardware, firmware or software.

In various examples, the computing platform 900 may be implemented as a wireless system, a wired system, or a combination of both. When implemented as a wireless system, the computing platform 900 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, the computing platform 900 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., non-volatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, GPUs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Additional Examples

Example 1 provides defect detection and correction circuitry comprising dynamic defect detection circuitry configured to receive an input signal specifying a plurality of pixel output values and an original output value of a pixel under correction (PUC), determine an average value based on a subset of the plurality of pixel output values, wherein the subset excludes a maximum pixel output value from among the plurality of pixel values and a minimum pixel output value from among the plurality of pixel output values, determine one or more thresholds based on the average value and a difference between a second highest pixel output value from the plurality of pixel output values and a second lowest pixel output value from the plurality of pixel output values, and based on the original output value of the PUC transgressing a threshold of the one or more thresholds, to provide a first output signal indicating that the PUC has a dynamic defect. The defect detection and correction circuitry further comprises defect correction circuitry coupled to the dynamic defect detection circuitry and configured to apply a defect correction process based on one of the first output signal or a defect signal indicating that the PUC has a mapped defect, and to produce, based on the defect correction process, a second output signal indicating a corrected output value for the PUC.

Example 2 includes the defect detection and correction circuitry of Example 1, wherein the subset further excludes the second highest pixel output value and the second lowest pixel output value.

Example 3 includes the defect detection and correction circuitry of Example 2, wherein the one or more thresholds include a first threshold and a second threshold, and wherein the dynamic defect detection circuitry is configured to provide the first output signal based on the original output value of the PUC being between the first and second thresholds.

Example 4 includes the defect detection and correction circuitry of any one of Examples 1-3, wherein the defect correction circuitry is configured to determine a plurality of directional gradients based on the plurality of pixel output values, and wherein the defection correction circuitry is configured to select, from among the plurality of pixel output values, one or more selected pixel output values based on a directional gradient having a smallest value among the plurality of directional gradients, and to produce the corrected output value for the PUC based on the one or more selected pixel output values.

Example 5 includes the defect detection and correction circuitry of any one of Examples 1-3, wherein individual pixel output values of the plurality of pixel output values correspond to respective pixels of a pixel array, and wherein the defect correction circuitry is configured to apply the defect correction process based on a number of the respective pixels having a mapped defect.

Example 6 includes the defect detection and correction circuitry of Example 5, wherein the number of the pixel having a mapped defect is two or more, and wherein to apply the defect correction process, the defect correction circuitry is configured to exclude the pixel output values corresponding to the respective pixels having the mapped defect to produce, from the plurality of pixel output values, a set of one or more remaining pixel output values, and to determine the corrected output value of the PUC based on a median of the set of one or more remaining pixel output values.

Example 7 includes the defect detection and correction circuitry of one of Examples 5 or 6, wherein the dynamic defect detection circuitry is configured to provide the number of the pixels having a mapped defect in the first output signal.

Example 8 is an image sensor comprising a pixel array including a plurality of pixels arranged in rows and columns, the plurality of pixels including a pixel under correction (PUC) and a plurality of surrounding pixels physically positioned around the PUC in the pixel array, the PUC configured to produce a PUC output signal having an original PUC value, and the plurality of surrounding pixels configured to produce a corresponding plurality of pixel output signals having respective pixel output values. The image sensor further comprises dynamic defect detection circuitry coupled to the pixel array and configured to determine an average value based on a subset of the respective pixel output values, wherein the subset excludes a maximum pixel output value and a minimum pixel output value from among the pixel output values, determine one or more thresholds based on the average value and a difference between a second highest pixel output value of pixel output values and a second lowest pixel output value of the pixel output values, and determine, based on the original PUC value and the one or more thresholds, whether the PUC has a dynamic defect. The image sensor further comprises defect correction circuitry coupled to the dynamic defect detection circuitry and configured to apply, based on one of an output signal from the dynamic defect detection circuitry indicating that the PUC has a dynamic defect or a defect signal indicating that the PUC has a mapped defect, a defect correction process to produce a corrected output value for the PUC.

Example 9 includes the image sensor of Example 8, wherein the subset further excludes the second highest pixel output value and the second lowest pixel output value.

Example 10 includes the image sensor of Example 9, wherein the one or more thresholds include a first threshold and a second threshold, and wherein the dynamic defect detection circuitry is configured to provide the output signal based on the original PUC value being between the first and second thresholds.

Example 11 includes the image sensor of Example 10, wherein the second threshold is based on the average value, the difference, and a detection factor, the detection factor being based on one or more parameters of the image sensor.

Example 12 includes the image sensor of Example 11, wherein the one or more parameters include any one or more of an integration time for the image sensor to acquire an image using the pixel array, an analog gain of the image sensor, a digital gain of the image sensor, or a temperature of the pixel array.

Example 13 includes the image sensor of any one of Examples 10-12 wherein the defect correction circuitry is configured to determine a plurality of directional gradients based on the pixel output values, determine a directional gradient having a smallest value among the plurality of directional gradients, select, from among the pixel output values, one or more selected pixel output values based on the directional gradient, and produce the corrected output value for the PUC based on the one or more selected pixel output values.

Example 14 includes the image sensor of any one of Examples 8-13, wherein the plurality of surrounding pixels includes a number of defective pixels, a defective pixel having a mapped defect, and wherein the defect correction circuitry is configured to apply the defect correction process based on the number of defective pixels.

Example 15 includes the image sensor of Example 14, wherein the number of the defective pixels is two or more, and wherein to apply the defect correction process, the defect correction circuitry is configured to exclude the pixel output values corresponding to the defective pixels to produce a set of one or more remaining pixel output values, and to determine the corrected output value of the PUC based on a median of the set of one or more remaining pixel output values.

Example 16 includes the image sensor of one of Examples 14 or 15, wherein the dynamic defect detection circuitry is configured to information to the defect correction circuitry, the information including the number of defective pixels.

Example 17 includes the image sensor of any one of Examples 8-16, wherein the pixel array is a color filter array, and wherein the plurality of surrounding pixels have a same color filter type as the PUC.

Example 18 is a computer program product comprising one or more non-transitory computer readable media storing instructions that, when executed by at least one processor, cause a process for defect detection and correction in an image sensor to be carried out, the image sensor including a pixel array. The process comprises receiving a signal specifying a plurality of pixel output values and an original output value of a pixel under correction (PUC), determining an average value based on a subset of the plurality of pixel output values, wherein the subset excludes a maximum pixel output value from among the plurality of pixel values and a minimum pixel output value from among the plurality of pixel output values, determining one or more thresholds based on the average value and a difference between a second highest pixel output value from the plurality of pixel output values and a second lowest pixel output value from the plurality of pixel output values, determining, based on the original output value of the PUC and the one or more thresholds, whether the PUC has a dynamic defect, and based on the PUC having the dynamic defect or a mapped defect, applying a defect correction process to produce a corrected output value for the PUC.

Example 19 includes the computer program product of Example 18, wherein the process further comprises determining a detection factor based on one or more parameters of the image sensor, the parameters including an integration time for the image sensor to acquire an image using the pixel array, an analog gain of the image sensor, a digital gain of the image sensor, or a temperature of the pixel array, and determining at least one of the one or more thresholds based on the average value, the difference, and the detection factor.

Example 20 includes the computer program product of one of Examples 18 or 19, wherein applying the defect correction process comprises determining a median value of a set including at least some of plurality of pixel output values, and producing the corrected output value for the PUC based on the median value.

Having described above several aspects of at least one embodiment, it is to be appreciated various alterations, modifications, and improvements will readily occur to those skilled in the art. Such alterations, modifications, and improvements are intended to be part of this disclosure. Accordingly, the foregoing description and drawings of various embodiments are presented by way of example only. These examples are not intended to be exhaustive or to limit application of the techniques described herein to the precise forms disclosed. The methods and apparatuses are capable of implementation in other embodiments and of being practiced or of being carried out in various ways. In addition, the phraseology and terminology used herein is for the purpose of description and should not be regarded as limiting. Any references to examples, components, elements, or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including", "comprising", "having", "containing", "involving", and variations thereof is meant to encompass the items listed thereafter and equivalents thereof as well as additional items. References to "or" can be construed as inclusive so that any terms described using "or" can indicate any of a single, more than one, and all of the described terms.

What is claimed is:

1. Defect detection and correction circuitry comprising:
    dynamic defect detection circuitry configured to
        receive an input signal specifying a plurality of pixel output values and an original output value of a pixel under correction (PUC),
        determine an average value based on a subset of the plurality of pixel output values, wherein the subset excludes a maximum pixel output value from among the plurality of pixel output values and a minimum pixel output value from among the plurality of pixel output values,
        determine one or more thresholds based on the average value and a difference between a second highest pixel output value from the plurality of pixel output values and a second lowest pixel output value from the plurality of pixel output values, and
        based on the original output value of the PUC transgressing a threshold of the one or more thresholds, to provide a first output signal indicating that the PUC has a dynamic defect; and
    defect correction circuitry coupled to the dynamic defect detection circuitry and configured to apply a defect correction process based on one of the first output signal or a defect signal indicating that the PUC has a mapped defect, and to produce, based on the defect correction process, a second output signal indicating a corrected output value for the PUC.

2. The defect detection and correction circuitry of claim 1, wherein the subset further excludes the second highest pixel output value and the second lowest pixel output value.

3. The defect detection and correction circuitry of claim 2, wherein the one or more thresholds include a first threshold and a second threshold, and wherein the dynamic defect detection circuitry is configured to provide the first output signal based on the original output value of the PUC being between the first and second thresholds.

4. The defect detection and correction circuitry of claim 1, wherein the defect correction circuitry is configured to determine a plurality of directional gradients based on the plurality of pixel output values; and
    wherein the defection correction circuitry is configured to select, from among the plurality of pixel output values, one or more selected pixel output values based on a directional gradient having a smallest value among the plurality of directional gradients, and to produce the corrected output value for the PUC based on the one or more selected pixel output values.

5. The defect detection and correction circuitry of claim 1, wherein individual pixel output values of the plurality of pixel output values correspond to respective pixels of a pixel array; and
    wherein the defect correction circuitry is configured to apply the defect correction process based on a number of the respective pixels having a mapped defect.

6. The defect detection and correction circuitry of claim 5, wherein the number of the pixel having a mapped defect is two or more; and
    wherein to apply the defect correction process, the defect correction circuitry is configured to:
        exclude the pixel output values corresponding to the respective pixels having the mapped defect to produce, from the plurality of pixel output values, a set of one or more remaining pixel output values; and
        determine the corrected output value of the PUC based on a median of the set of one or more remaining pixel output values.

7. The defect detection and correction circuitry of claim 5, wherein the dynamic defect detection circuitry is configured to provide the number of the pixels having a mapped defect in the first output signal.

8. An image sensor comprising:
    a pixel array including a plurality of pixels arranged in rows and columns, the plurality of pixels including a pixel under correction (PUC) and a plurality of surrounding pixels physically positioned around the PUC in the pixel array, the PUC configured to produce a PUC output signal having an original PUC value, and the plurality of surrounding pixels configured to produce a corresponding plurality of pixel output signals having respective pixel output values;
    dynamic defect detection circuitry coupled to the pixel array and configured to
        determine an average value based on a subset of the respective pixel output values, wherein the subset excludes a maximum pixel output value and a minimum pixel output value from among the pixel output values,
        determine one or more thresholds based on the average value and a difference between a second highest pixel output value of pixel output values and a second lowest pixel output value of the pixel output values, and
        determine, based on the original PUC value and the one or more thresholds, whether the PUC has a dynamic defect; and
    defect correction circuitry coupled to the dynamic defect detection circuitry and configured to apply, based on one of an output signal from the dynamic defect detection circuitry indicating that the PUC has a dynamic defect or a defect signal indicating that the PUC has a mapped defect, a defect correction process to produce a corrected output value for the PUC.

9. The image sensor of claim 8 wherein the subset further excludes the second highest pixel output value and the second lowest pixel output value.

10. The image sensor of claim 9, wherein the one or more thresholds include a first threshold and a second threshold, and wherein the dynamic defect detection circuitry is configured to provide the output signal based on the original PUC value being between the first and second thresholds.

11. The image sensor of claim 10, wherein the second threshold is based on the average value, the difference, and a detection factor, the detection factor being based on one or more parameters of the image sensor.

12. The image sensor of claim 11, wherein the one or more parameters include any one or more of an integration time for the image sensor to acquire an image using the pixel array, an analog gain of the image sensor, a digital gain of the image sensor, or a temperature of the pixel array.

13. The image sensor of claim 10, wherein the defect correction circuitry is configured to:
   determine a plurality of directional gradients based on the pixel output values;
   determine a directional gradient having a smallest value among the plurality of directional gradients;
   select, from among the pixel output values, one or more selected pixel output values based on the directional gradient; and
   produce the corrected output value for the PUC based on the one or more selected pixel output values.

14. The image sensor of claim 8; the plurality of surrounding pixels includes a number of defective pixels, a defective pixel having a mapped defect; and
   wherein the defect correction circuitry is configured to apply the defect correction process based on the number of defective pixels.

15. The image sensor of claim 14, wherein the number of the defective pixels is two or more; and
   wherein to apply the defect correction process, the defect correction circuitry is configured to:
   exclude the pixel output values corresponding to the defective pixels to produce a set of one or more remaining pixel output values; and
   to determine the corrected output value of the PUC based on a median of the set of one or more remaining pixel output values.

16. The image sensor of claim 14, wherein the dynamic defect detection circuitry is configured to information to the defect correction circuitry, the information including the number of defective pixels.

17. The image sensor of claim 8, wherein the pixel array is a color filter array, and wherein the plurality of surrounding pixels have a same color filter type as the PUC.

18. A computer program product comprising one or more non-transitory computer readable media storing instructions that, when executed by at least one processor, cause a process for defect detection and correction in an image sensor to be carried out, the image sensor including a pixel array, and the process comprising:
   receiving a signal specifying a plurality of pixel output values and an original output value of a pixel under correction (PUC);
   determining an average value based on a subset of the plurality of pixel output values, wherein the subset excludes a maximum pixel output value from among the plurality of pixel values and a minimum pixel output value from among the plurality of pixel output values;
   determining one or more thresholds based on the average value and a difference between a second highest pixel output value from the plurality of pixel output values and a second lowest pixel output value from the plurality of pixel output values;
   determining, based on the original output value of the PUC and the one or more thresholds, whether the PUC has a dynamic defect; and
   based on the PUC having the dynamic defect or a mapped defect, applying a defect correction process to produce a corrected output value for the PUC.

19. The computer program product of claim 18, wherein the process further comprises:
   determining a detection factor based on one or more parameters of the image sensor, the parameters including an integration time for the image sensor to acquire an image using the pixel array, an analog gain of the image sensor, a digital gain of the image sensor, or a temperature of the pixel array; and
   determining at least one of the one or more thresholds based on the average value, the difference, and the detection factor.

20. The computer program product of claim 18, wherein applying the defect correction process comprises:
   determining a median value of a set including at least some of plurality of pixel output values; and
   producing the corrected output value for the PUC based on the median value.

* * * * *